(12) United States Patent
Xu

(10) Patent No.: US 12,538,010 B2
(45) Date of Patent: Jan. 27, 2026

(54) HYBRID VIEWFINDER WITH TRANSPARENT IMAGING SENSOR

(71) Applicant: Adeia Imaging LLC, San Jose, CA (US)

(72) Inventor: Ning Xu, Irvine, CA (US)

(73) Assignee: Adeia Imaging LLC, San Jose, CA (US)

( * ) Notice: Subject to any disclaimer, the term of this patent is extended or adjusted under 35 U.S.C. 154(b) by 102 days.

(21) Appl. No.: 18/641,760

(22) Filed: Apr. 22, 2024

(65) Prior Publication Data

US 2025/0330696 A1 Oct. 23, 2025

(51) Int. Cl.
*H04N 23/63* (2023.01)
*G03B 13/06* (2021.01)

(52) U.S. Cl.
CPC ............ *H04N 23/63* (2023.01); *G03B 13/06* (2013.01)

(58) Field of Classification Search
CPC ............................... H04N 23/63; G03B 13/06
USPC ...................................... 348/333.01
See application file for complete search history.

(56) References Cited

U.S. PATENT DOCUMENTS

| | | | |
|---|---|---|---|
| 7,976,950 | B2 | 7/2011 | Okai et al. |
| 2007/0284557 | A1 | 12/2007 | Gruner et al. |
| 2013/0048339 | A1 | 2/2013 | Tour et al. |
| 2013/0333266 | A1 | 12/2013 | Gose et al. |
| 2015/0249034 | A1 | 9/2015 | Kondo et al. |
| 2017/0019627 | A1* | 1/2017 | Wan .................. H04N 7/152 |

(Continued)

FOREIGN PATENT DOCUMENTS

| | | |
|---|---|---|
| WO | 2011/081473 A2 | 7/2011 |
| WO | 2014/112766 A1 | 7/2014 |

OTHER PUBLICATIONS

BioOptics World Editors, "Researchers detail transparent graphene sensor technology for bioimaging, optogenetics," Bio&Life Sciences, BioImaging and Fluorescence, available online at: <https://www.laserfocusworld.com/biooptics/bioimaging/fluorescence/article/14191715/researchers-detail-transparent-graphene-sensor-technology-for-bioimaging-optogenetics>, Oct. 17, 2016 (7 pages).

(Continued)

*Primary Examiner* — Joel W Fosselman
(74) *Attorney, Agent, or Firm* — HALEY GUILIANO LLP

(57) ABSTRACT

A digital camera and a dual-mode viewfinder are provided. The camera includes aligned components along a common axis for real-time optical viewing, quick subject capture, and digital overlay display without switching modes or viewpoints. Features include a real-time display, an optical viewfinder (OVF) experience, a graphene-based sensor, a compact design, a common axis OVF/digital viewfinder (DVF) design, dual-mode functionality, single viewpoint operation, a transparent display, a real-time overlay, automatic switching, user-triggered image capture, one or more coatings, and battery life optimization. The dual-mode viewfinder includes a transparent imaging sensor and a transparent display, both aligned along a common axis. It can switch between an optical viewfinder mode and a digital viewfinder mode based on a user command or a proximity sensor detecting a distance to a user. The system also includes control circuitry configured to perform these features. Related processes, subprocesses, apparatuses, devices, techniques, and articles are also described.

20 Claims, 12 Drawing Sheets

(56) References Cited

U.S. PATENT DOCUMENTS

| | | | |
|---|---|---|---|
| 2017/0057827 A1 | 3/2017 | Sultana et al. | |
| 2018/0276843 A1* | 9/2018 | Send | G02B 3/14 |
| 2023/0267732 A1 | 8/2023 | Burnsed et al. | |

OTHER PUBLICATIONS

FujiFilm Value from Innovation, "X Series Fujifilm X-Pro2," available online at: <https://web.archive.org/web/20160117230338/http://www.fujifilm.com/products/digital_cameras/x/fujifilm_x_pro2/features/page_02.html>, Jan. 17, 2016 (4 pages).

Haine, C. "All the NDs You Need in One Liquid Crystal Filter from Panavision," (https://nofilmschool.com/LCND-filter-panavision) (Mar. 31, 2019) (10 pages).

Huangfu, G., et al., "Visible or Near-Infrared Light Self-Powered Photodetectors Based on Transparent Ferroelectric Ceramics," ACS Applied Materials & Interfaces, 12(30):33950-33959 (2020).

Hughes, S.K., et al., Gear, "The Fujifilm X-Pro2 Hybrid Viewfinder," (download Mar. 12, 2024) (www.sethhughes.com/hands-fujifilm-x-pro2-hybrid-viewfinder/) (5 pages).

Lien, M. B., et al., "Ranging and light field imaging with transparent photodetectors," Nature Photonics, vol. 14, pp. 143-148 (2020) with Supplementary Information (16 pages).

Mitchell, R., "Transparent Image Sensors: The Future with Graphene & Quantum Dots," electro pages, available online at: <https://www.electropages.com/blog/2023/09/researchers-create-transparent-image-sensor>, Sep. 20, 2023 (4 pages).

Nguyen, T. T., et al., "All-transparent tandem photovoltaic-powered photodetector," Nano Energy, vol. 116 (Nov. 2023) (10 pages).

Peleg, R., "Researchers design semitransparent image sensors for eye-tracking applications using graphene and QDs," Graphene-info, ACS Photonics, available online at: <https://www.graphene-info.com/researchers-design-semitransparent-image-sensors-eye-tracking-applications>, Sep. 17, 2023 (3 pages).

Pfirstinger, R., "First Look Review: Fujifilm X-Pro2," Fuji X Secrets (https://fuji-x-secrets-net/) Jan. 16, 2016 (37 pages) (2 parts).

Ringsmuth, S., "Optical Versus Electronic Viewfinders: Which Is Best in 2024?," available online at: <https://digital-photography-school.com/optical-versus-electronic-viewfinders-best/>, retrieved on May 23, 2024 (24 pages).

Wikipedia, "See-through display," available online at: <https://en.wikipedia.org/wiki/See-through_display>, retrieved on May 23, 2024 (6 pages).

Wilson, L., "Image sensor created from flexible, transparent polymer," Vision Systems Design, available online at: <https://www.vision-systems.com/home/article/16743133/image-sensor-created-from-flexible-transparent-polymer>, Mar. 5, 2013 (14 pages).

Zhang, B. C., et al., "Single-Crystalline Silicon Frameworks: A New Platform for Transparent Flexible Optoelectronics," Advanced Materials, 33(24):e2008171 (May 8, 2021) (10 pages).

Zhang, D., et al., "Neural network based 3D tracking with a graphene transparent focal stack imaging system," Nature Communications, 12(1)2413 (Apr. 23, 2021) (7 pages).

* cited by examiner

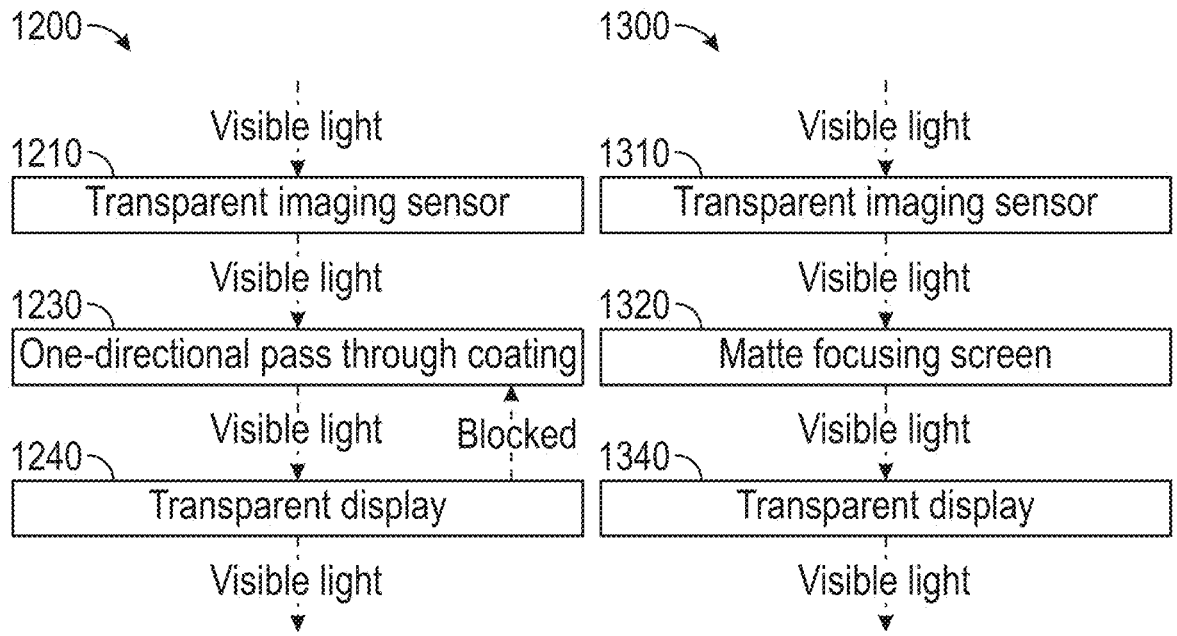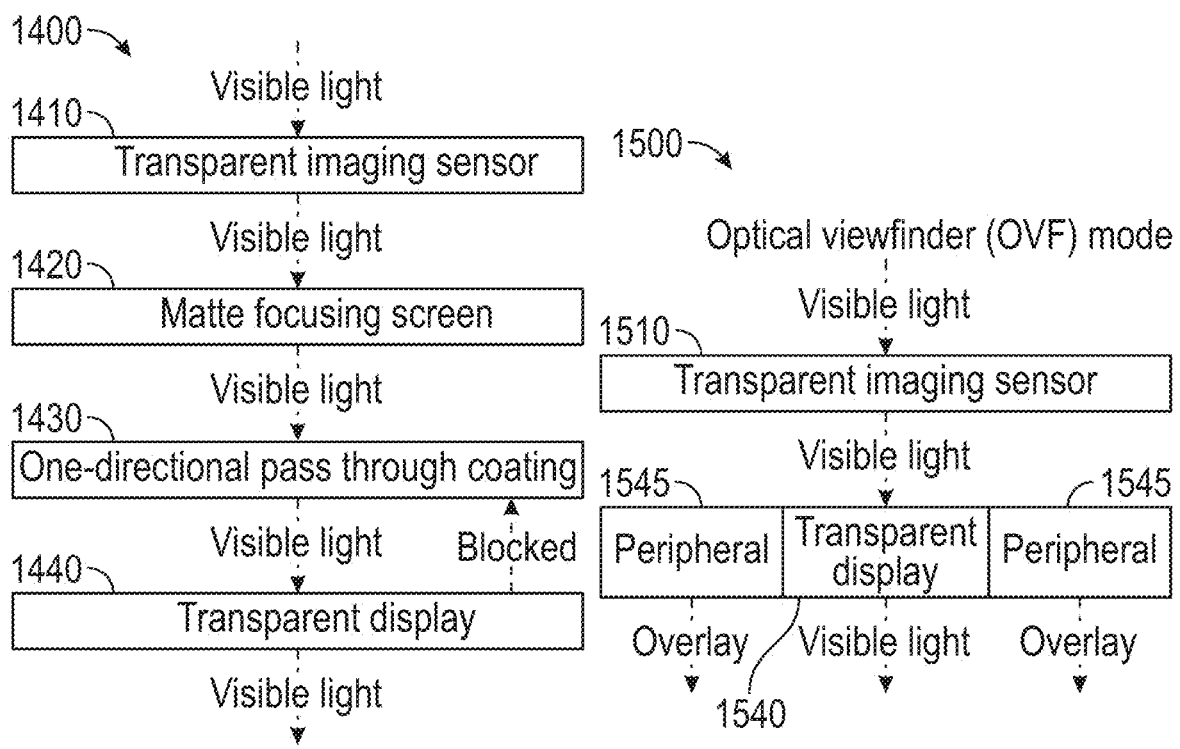

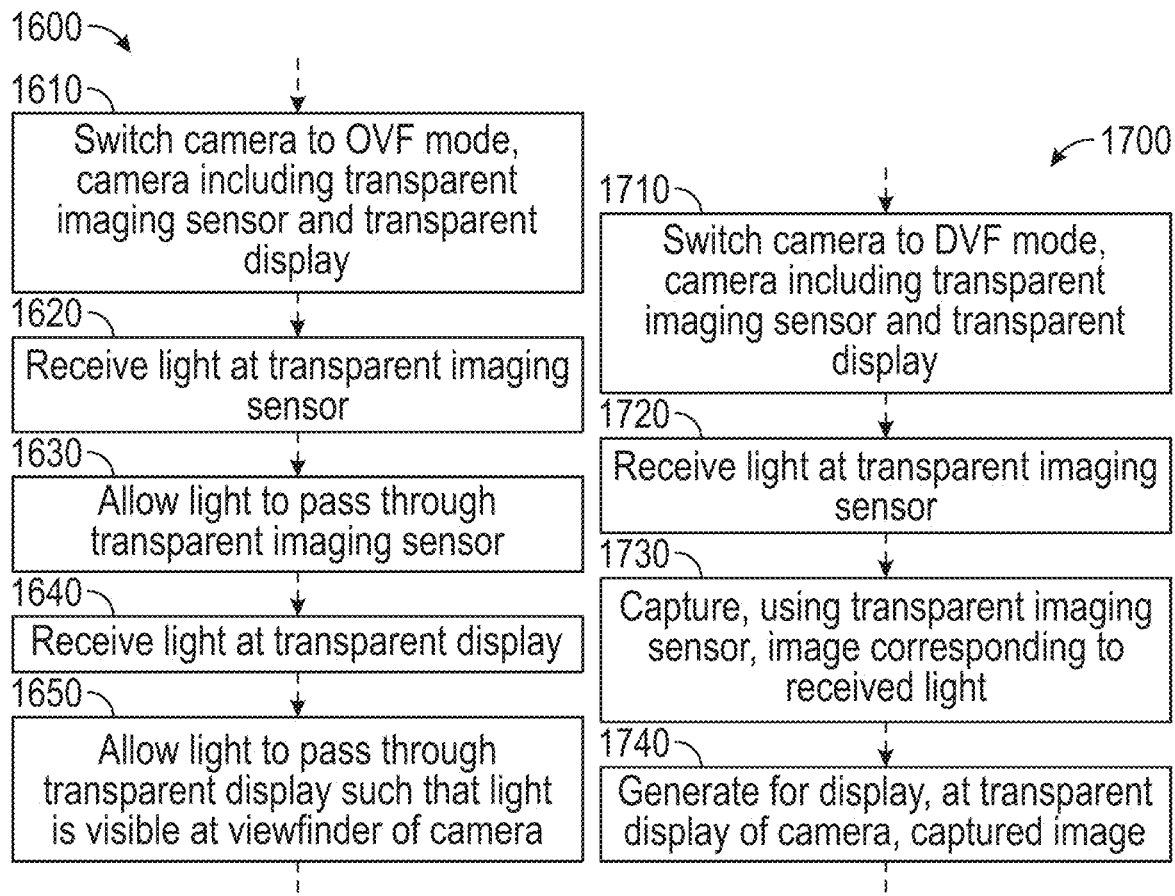
FIG. 16
FIG. 17
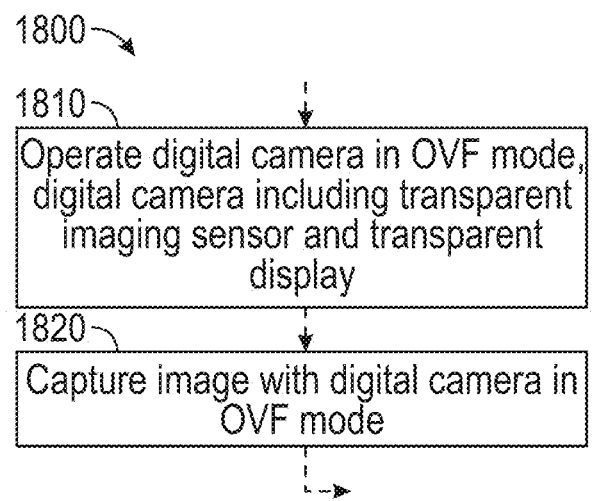
FIG. 18

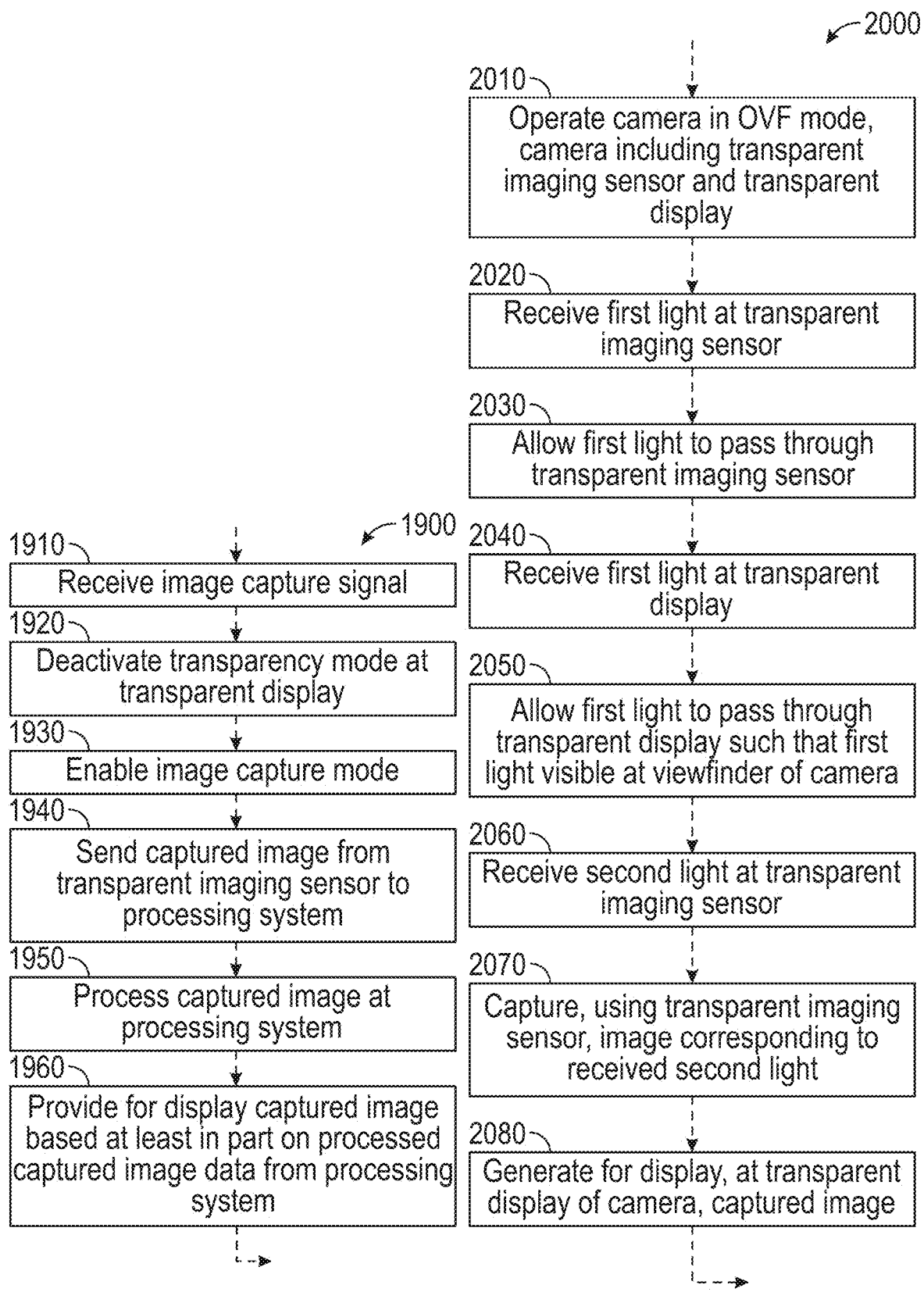

HYBRID VIEWFINDER WITH TRANSPARENT IMAGING SENSOR

FIELD OF THE DISCLOSURE

The present disclosure relates to digital imaging including digital cameras.

SUMMARY

In some approaches, digital cameras are provided with an optical viewfinder in one part of the device and an electronic viewfinder in another part of the device. As illustrated in FIG. 3A, in one approach, a digital camera 310 includes an optical viewfinder 320 located in a top portion of a back side of the digital camera 310 and an electronic viewfinder 330 located in a lower portion of the back side of the digital camera 310. That is, the digital camera 310 has two viewpoints, one via the optical viewfinder 320 that requires a user to place their eye relatively close (e.g., less than about two inches (or about five centimeters)) to the digital camera 310, and another that requires the user to orient their eyes a spaced distance (e.g., about an arm's length of the user) apart from the digital camera 310. However, the first viewpoint through the electronic viewfinder 320 is undesirable, because the user loses use of the conventional electronic viewfinder 330 during operation, and natural oil and/or makeup on the skin of the user can easily be deposited on the conventional electronic viewfinder 330, requiring cleaning. Conversely, the second viewpoint through the electronic viewfinder 330 is undesirable, because the user loses use of the optical viewfinder 320 during operation. Also, the digital camera 310 presents a delay and disconnect preventing a user from capturing an image as they see it, presents a delay between display of different types of information on the two viewfinders, requires relatively high power consumption, has decreased performance in low light, and causes eye strain over prolonged use.

Similarly, as illustrated in FIG. 3B, in another approach, with a relatively larger body digital single lens reflex (DSLR) camera 340, an optical viewfinder 350 is located in a top portion of a back side of the DSLR camera 340 and an electronic viewfinder 360 is located in a lower portion of the back side of the DSLR camera 340. The DSLR camera 340 suffers from the same problems noted above regarding the digital camera 310.

In still another approach, as illustrated in FIGS. 3C and 3D, a digital camera 370 includes a hybrid multi viewfinder. The digital camera 370 includes bulky, expensive structures, some oriented on a horizontal axis 373 and others on a vertical axis 376 perpendicular to each other. The digital camera 370 includes a first lens assembly 379 oriented along the horizontal axis 373 that directs light towards a pass-through mirror 382, which allows light to pass through to a second lens assembly 392 to an optical viewfinder 394. The digital camera 370 includes a compact digital display 385 oriented along the vertical axis 376 that outputs digital imagery, the light of which passes through a third lens assembly 388 towards the pass-through mirror 382, which reflects the digital imagery at a 90 degree angle to the second lens assembly 392 to the optical viewfinder 394. Further, the digital camera 370 includes both the optical viewfinder 394 and an electronic viewfinder 397. Thus, the digital camera 370 suffers from the same problems noted above regarding the digital camera 310 and the digital camera 340.

To help address the limitations and problems of these and other approaches, several embodiments of a hybrid digital camera system and a dual-mode viewfinder system for a digital camera are provided with various combinations of features. In some embodiments, a hybrid digital camera system is provided that aligns various components along a common axis, which allows for real-time optical viewing, quick subject capture, and the display of digital overlays without the need to switch modes or viewpoints. For example, the hybrid digital camera system includes at least one of a real-time display, an optical viewfinder (OVF) experience, a graphene-based sensor, a compact design, a common axis OVF/digital viewfinder (DVF) design, a dual-mode viewfinder system, dual-mode functionality, single viewpoint operation, a transparent display, a real-time overlay, automatic switching, user-triggered image capture, one or more coatings with one or more optical properties, battery life optimization, combinations of the same, or the like.

For example, the real-time display includes a transparent display to show camera settings, digital overlays, and image previews in real time, thereby enhancing the user experience. For example, a matte focusing screen provides an OVF experience with real-time viewing, free from electronic delays, and providing immediate feedback. For example, the graphene-based sensor includes a transparent imaging sensor that employs graphene technology having high electron mobility and efficient light-to-electrical signal conversion, which contributes to superior image quality. For example, the compact design, detailed herein, is more compact and less bulky than digital cameras and DSLRs of other approaches, increasing portability. For example, the dual-mode functionality allows for switching between DVF mode and OVF mode from a same viewpoint, providing greater flexibility to the user. For example, the transparent display includes a one-directional pass-through coating, which prevents light from passing from outside the camera towards an interior of the camera (including the image sensor). A camera equipped with, for example, a transparent display and transparent image sensor provides both functions for a DVF and information display for an OVF without obstructing the optical view. For example, the real-time overlays provide real-time optical viewing with digital overlays, such as exposure settings and focus points, providing capture of a "perfect shot." For example, automatic switching includes an automatic switching mechanism between OVF and DVF modes. The automatic switching is based, for example, on a proximity of the user to a sensor, simplifying operation. The automatic switching enhances the user experience. For example, the user-triggered image capture includes user-triggered image capturing, deactivation of transparency mode, and enabling image capture mode for clear image display. For example, one or more coatings are provided including a one-directional pass-through coating and a black coating on a transparent display to manage light during image capture. For example, battery life optimization is achieved with the OVF mode, which conserves battery life, while providing optional display and review of captured content post-capture.

In some embodiments, a dual-mode viewfinder for a digital camera is provided. The viewfinder includes a transparent imaging sensor and a transparent display, both aligned along a common axis. In an OVF mode, light passes through these components, while in a DVF mode, the sensor captures an image that is displayed on the transparent display. The viewfinder can switch between these modes, in some examples, based on a distance (e.g., to a user) detected by a proximity sensor. The display can also show camera settings, a digital overlay, a histogram, and a real-time preview of the final image. In some embodiments, the imaging sensor is made of a high electron mobility and broadband absorption material like graphene. For example, all light passing through the camera and the viewfinder is substantially oriented along a common axis. For example, in some embodiments, all light passing from a front side of the digital camera, through at least one lens, and through the dual-mode viewfinder including the transparent imaging sensor and the transparent display is substantially oriented along on a common axis that passes through or near a central point of the at least one lens, and the dual-mode viewfinder including the transparent imaging sensor and the transparent display.

In some embodiments, a method of operating a dual-mode viewfinder for a digital camera is provided. The viewfinder, which includes a transparent imaging sensor and a transparent display, can switch between an OVF mode and a DVF mode. In the optical mode, light passes through the sensor and display, while in the digital mode, the sensor captures an image that is displayed on the transparent display. The switching between modes can be based on a user command or a proximity sensor detecting a distance (e.g., to a user).

Also provided is a system with control circuitry configured to perform one or more of the above-referenced features. Further provided is a device equipped with means for performing one or more of the above-referenced features. Still further provided is a non-transitory, computer-readable medium with instructions that, when executed, perform one or more of the above-referenced features. Related processes, subprocesses, apparatuses, devices, techniques, and articles are also provided.

The present invention is not limited to the combination of the elements as listed herein and may be assembled in any combination of the elements as described herein. These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, of which:

FIG. 12 depicts a diagram of a viewfinder of a camera including transmission of visible light through a transparent imaging sensor, a one-directional pass-through coating, and a transparent display of the camera, in accordance with some embodiments of the disclosure;

FIG. 13 depicts a diagram of a viewfinder of a camera including transmission of visible light through a transparent imaging sensor, a matte focusing screen, and a transparent display of the camera, in accordance with some embodiments of the disclosure;

FIG. 14 depicts a diagram of a viewfinder of a camera including transmission of visible light through a transparent imaging sensor, a matte focusing screen, a one-directional pass-through coating, and a transparent display of the camera, in accordance with some embodiments of the disclosure;

FIG. 15 depicts a diagram of a viewfinder of a camera in an OVF mode including transmission of visible light through a transparent imaging sensor and a transparent display of the camera, the transparent display including a peripheral region for display of an overlay, in accordance with some embodiments of the disclosure;

FIG. 16 depicts a process for a camera including a dual-mode viewfinder operating in an OVF mode, in accordance with some embodiments of the disclosure;

FIG. 17 depicts a process for a camera including a dual-mode viewfinder operating in a DVF mode, in accordance with some embodiments of the disclosure;

FIG. 18 depicts a process for a camera including a viewfinder operating in an OVF mode, in accordance with some embodiments of the disclosure;

FIG. 19 depicts a process for a camera including a viewfinder operating in an OVF mode, the process including image capture and processing, in accordance with some embodiments of the disclosure;

Figure 21:
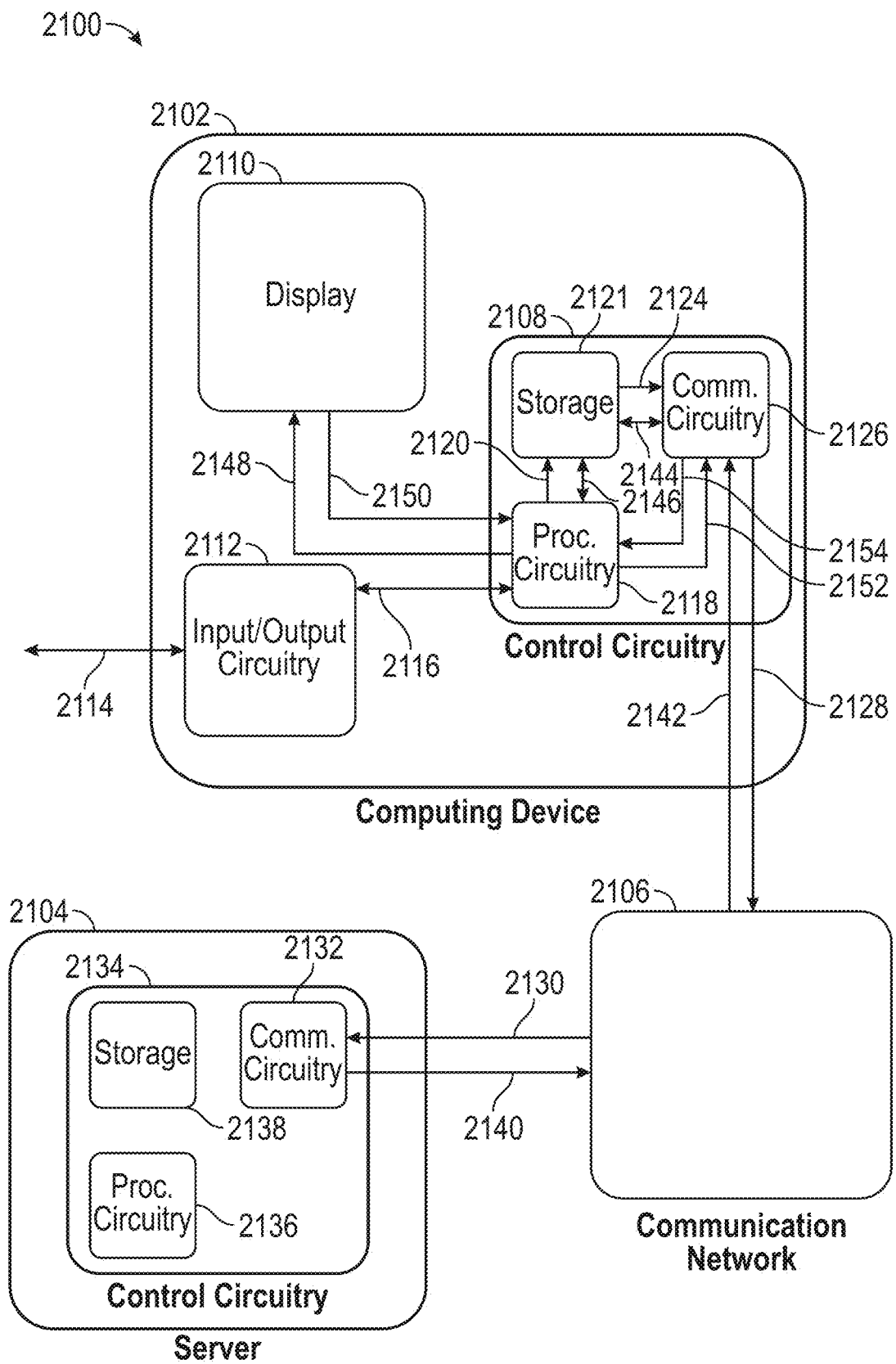

FIG. 20 depicts a process for a camera including a viewfinder operating in an OVF mode, the process including first and second light through components of the camera, in accordance with some embodiments of the disclosure; and FIG. 21 depicts a system including a server, a communication network, and a computing device for performing the methods and processes noted herein, in accordance with some embodiments of the disclosure.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

A digital camera with a dual-mode viewfinder having an optical viewfinder (OVF) mode and a digital viewfinder (DVF) mode is provided. The OVF mode includes display of an overlay (e.g., a digital information overlay) with additional information. The digital camera with the dual-mode viewfinder allows photographers to operate the digital camera without choosing between the OVF and the DVF. In some embodiments, only the OVF is provided.

The OVF mode of the digital camera provides real-time viewing without delay and superior performance in low-light conditions. The OVF mode also provides a what-you-see-is-what-you-get (WYSIWYG) experience without a relatively bulky configuration. Optionally, the digital camera has a DVF mode, which provides an accurate preview of a final image. The DVF mode delivers extensive shooting information. The DVF mode allows for a relatively compact camera design.

In some embodiments, the digital camera provides an ability to switch between OVR and DVF modes while also providing a true real-time optical experience with real-time digital overlays and/or previews. For example, the digital camera delivers the OVR and DVF viewing mechanisms within a single, user-friendly interface and as part of a compact, relatively inexpensive camera system. The digital camera is mirrorless in some embodiments.

The digital camera includes a transparent imaging sensor in some embodiments. The transparent imaging sensor captures and converts light into one or more electronic signals without obstructing one or more optical viewing paths. The transparent imaging sensor enhances design and functionality of the digital camera. The transparent imaging sensor captures 3D and/or multi-focal-plane imaging information using, e.g., a plurality of layered transparent sensors, for example. The plurality of transparent imaging sensors allow light to pass through each layer with a pass-through rate of about 97%, for example. Additional applications for transparent image sensors are provided. The transparent imaging sensor includes graphene, for example. The transparent imaging sensor includes, for example, other transparent materials. The digital camera includes a viewfinder that maintains optical clarity and immediacy of an OVF while incorporating digital information and WYSIWYG capabilities of a DVF. The digital camera provides a "best of both worlds" device without significant trade-offs.

Figure 1:
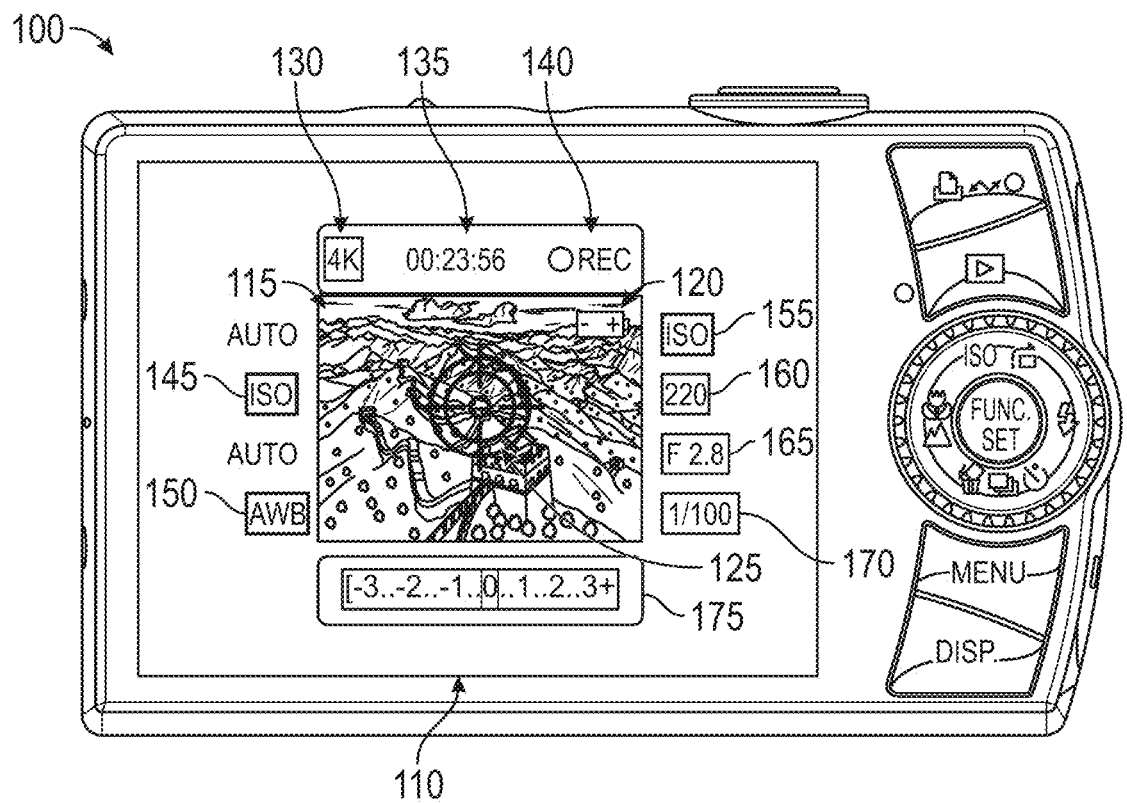
FIG. 1 depicts a back side of a digital camera with a dual-mode viewfinder in an OVF mode, in accordance with some embodiments of the disclosure.

FIG. 1 depicts a back side of a digital camera 100 with a dual-mode viewfinder 110 in an OVF mode, in accordance with some embodiments of the disclosure. For example, the dual-mode viewfinder 110 is configured to display at least one of an optical view 115 (e.g., an actual image made up of light passing through a lens of the digital camera 100), a battery life indicator 120 (e.g., superimposed over the view 115), a crosshairs 125 (e.g., superimposed over the view 115), a video resolution 130 (e.g., "4K"), a time of recording 135 (e.g., "00:23:56" indication hours, minutes, and seconds of recording time), a recording indicator 140, an automatic international organization for standardization (ISO) setting 145 (e.g., "Auto" meaning "automatic"), an automatic white balance (AWB) setting 150 (e.g., "Auto"), an ISO indicator 155, a manual ISO setting 160 (e.g., "220"), an f-stop setting 165 (e.g., "F 2.8"), a shutter speed setting 170 (e.g., "1/100"), and an exposure value (EV) indicator 175 (e.g., −3, −2, −1, 0 (highlighted here), +1, +2, +3), combinations of the same, or the like. In the example of FIG. 1, each of the crosshairs 125, the video resolution 130, the time of recording 135, the recording indicator 140, the automatic ISO setting 145, the AWB setting 150, the ISO indicator 155, the manual ISO setting 160, the f-stop setting 165, the shutter speed setting 170, and the EV indicator 175 are simultaneously displayed about a periphery of the optical view 115. In some embodiments, each of the battery life indicator 120, the video resolution 130, the time of recording 135, the recording indicator 140, the automatic ISO setting 145, the AWB setting 150, the ISO indicator 155, the manual ISO setting 160, the f-stop setting 165, the shutter speed setting 170, and the EV indicator 175 are simultaneously displayed about the periphery of the optical view 115 in real time with the optical view 115. Thus, the digital camera 110 delivers a useful combination of information from a single viewpoint. The displays described herein with reference to FIG. 1 are provided via a transparent display (e.g., 410 or 510), for example.

Figure 2:
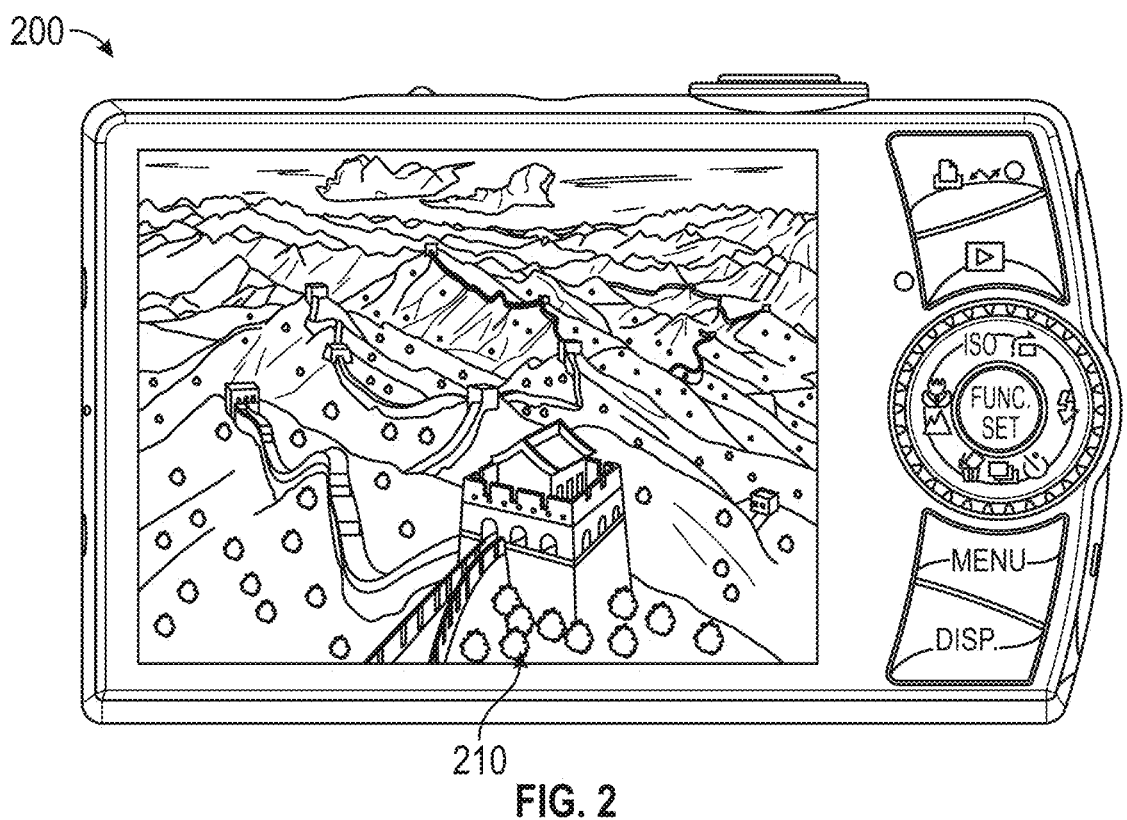
FIG. 2 depicts a back side of a digital camera with a dual-mode viewfinder in a DVF mode, in accordance with some embodiments of the disclosure.

FIG. 2 depicts a back side of a digital camera 200 with a dual-mode viewfinder in a DVF mode, in accordance with some embodiments of the disclosure. In the DVF mode, the digital camera 200 displays an image captured by a transparent imaging sensor (e.g., 430 or 540). The displays described herein with reference to FIG. 2 are provided via a transparent display (e.g., 410 or 510), for example.

In some embodiments, a transparent imaging sensor (e.g., 430 or 540) is integrated into a digital camera. For example, the transparent imaging sensor utilizes a graphene-based transparent imaging sensor that allows for light to pass through to a matte focusing screen, enabling both optical and digital view finding capabilities without a need for physical switching mechanisms.

In some embodiments, a dual-mode viewfinder system (e.g., FIGS. 1, 2, 4 and 5) is provided. For example, the dual-mode viewfinder system provides an ability to switch between a DVF mode and an OVF mode within a same device at a same location, i.e., viewable from a same viewpoint. For example, the dual-mode viewfinder system leverages an ability of a transparent display to either show one or more digital overlays and/or one or more previews or become transparent for an unobstructed optical view through the matte focusing screen and showing only the overlays.

In some embodiments, a transparent display (e.g., 410 or 510) with a one-directional pass-through coating (e.g., 520) is provided. For example, the transparent display provides both a DVF function and an information display for an OVF. For example, the one-directional pass-through coating (e.g., 520) on the back of the transparent display (e.g., 410 or 510) blocks light from passing to the transparent imaging sensor (e.g., 430 or 540).

In some embodiments, real-time optical viewing with one or more digital overlays is provided. For example, the display of digital information overlays (e.g., exposure settings, focus points, or the like) is provided while in the OVF mode without adding an additional information display. The display of the digital information overlays allows benefits of real-time optical viewing with an advantage of digital information. Thus, the chance of capture of "the perfect shot" is improved.

In some embodiments, automatic switching of OVF and DVF is provided. For example, a method and system to automatically switch the viewfinder between OVF mode and DVF mode is provided (see, e.g., FIG. 8 and related descriptions). For example, the automatic switch is based at least in part on a proximity of eyes of a user to a sensor.

Figure 4:
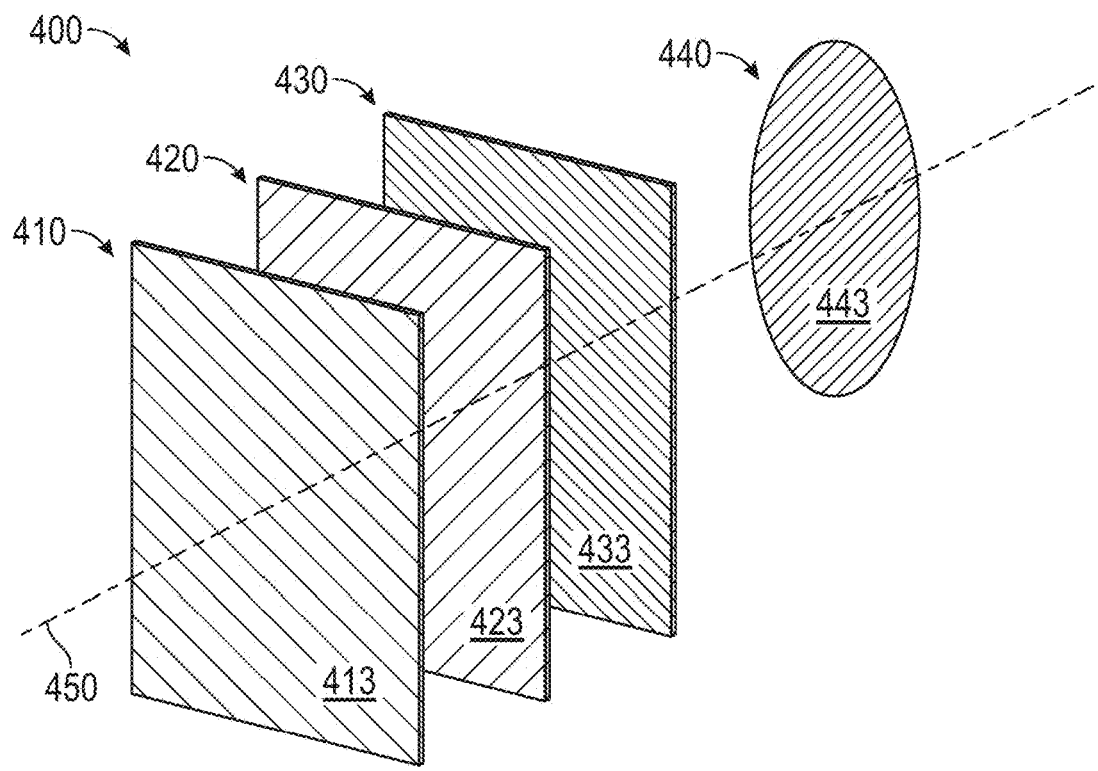
FIG. 4 depicts an exploded view of components of a dual-mode viewfinder for a digital camera, in accordance with some embodiments of the disclosure.

FIG. 4 depicts an exploded view of components of a dual-mode viewfinder for a digital camera, in accordance with some embodiments of the disclosure. In some embodiments, a hybrid viewfinder system is provided that integrates an OVF and a DVF. For example, a dual-mode viewfinder assembly 400 includes at least one of a transparent display 410, a matte focusing screen 420, a transparent imaging sensor 430, a lens 440, combinations of the same, or the like. The transparent imaging sensor 430 is combined with the matte focusing screen 420 and/or the transparent display 410. In some embodiments, the transparent imaging sensor 430 includes one or more graphene-based transparent sensors. The transparent imaging sensor 430 is configured for image capturing. The transparent imaging sensor 430 is configured to allow light to pass through to the matte focusing screen 420. The dual-mode viewfinder assembly 400 provides a real-time optical viewing experience. The transparent imaging sensor 430 captures an image while the assembly 400 provides the real-time optical viewing experience.

Simultaneously, the transparent display 410, which is layered behind the matte focusing screen 420, provides one or more digital overlays. The one or more digital overlays provide features including at least one of an exposure setting, a histogram, a live preview of a captured image, combinations of the same, or the like. The dual-mode viewfinder assembly 400 integrates digital advantages of a DVF.

In some embodiments, at least one of the transparent display 410, the matte focusing screen 420, the transparent imaging sensor 430, the lens 440, combinations of the same, or the like are provided along a common axis 450. For example, the common axis 450 passes through a center point of each of the transparent display 410, the matte focusing screen 420, the transparent imaging sensor 430, and the lens 440. Also, for example, the transparent display 410 faces an operator of the digital camera. The matte focusing screen 420 is provided between the transparent display 410 and the transparent imaging sensor 430, for example. The transparent imaging sensor 430 is provided between the matte focusing screen 420 and the lens 440, for example.

In some embodiments, a first side 413 of the transparent display 410 is oriented in a direction that faces an operator of the digital camera. For example, a first side 423 of the matte focusing screen 420 faces a second side (not shown) of the transparent display 410. For example, a first side 433 of the transparent imaging sensor 430 faces a second side (not shown) of the matte focusing screen 420. For example, a first side 443 of the lens 440 faces a second side (not shown) of the transparent imaging sensor 430.

In some embodiments, the transparent display 410 displays at least one of a camera setting, a digital overlay (e.g., a histogram), a preview of a final image, combinations of the same, or the like. For example, the transparent display 410 displays the camera setting, the digital overlay (including the histogram), and the preview of the final image in real time including real-time adjustments.

In some embodiments, the matte focusing screen 420 provides an OVF experience. For example, the matte focusing screen 420 provides the OVF experience with real-time viewing, which is unaffected by electronic delays.

In some embodiments, the transparent imaging sensor 430 utilizes graphene-based technology. For example, the transparent imaging sensor 430 with graphene provides high electron mobility and broadband absorption. For example, the transparent imaging sensor 430 is transparent and provides effective light-to-electrical signal conversion.

In some embodiments, the lens 440 directs light towards the transparent imaging sensor 430. For example, the lens 440 allows real-time optical viewing through the matte focusing screen 420. For example, the lens 440 is part of a lens assembly having a plurality of lenses.

Figure 5:
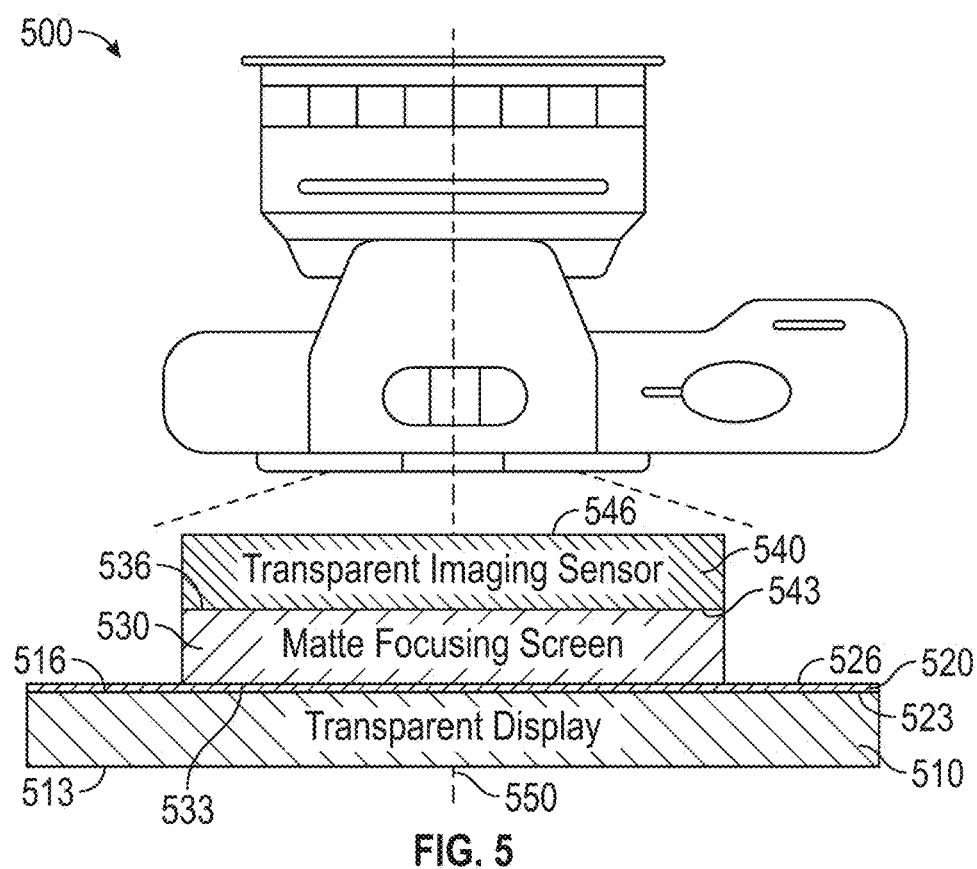
FIG. 5 depicts a schematic plan view of a digital camera including components of a dual-mode viewfinder for the digital camera, in accordance with some embodiments of the disclosure.

FIG. 5 depicts a schematic plan view of a digital camera 500 including components of a dual-mode viewfinder for the digital camera, in accordance with some embodiments of the disclosure. For example, the dual-mode viewfinder of the digital camera 500 includes at least one of a transparent display 510, a one-directional pass-through coating 520, a matte focusing screen 530, a transparent imaging sensor 540, combinations of the same, or the like. The transparent imaging sensor 540 is combined with the matte focusing screen 530 and/or the transparent display 510, for example. In some embodiments, the transparent imaging sensor 540 includes one or more graphene-based transparent sensors. The transparent imaging sensor 540 is configured for image capturing, for example. The transparent imaging sensor 540 is configured to allow light to pass through to the matte focusing screen 530, for example. The dual-mode viewfinder provides a real-time optical viewing experience. The transparent imaging sensor 540 captures an image while the assembly provides the real-time optical viewing experience. Simultaneously, the transparent display 510, which is layered behind the matte focusing screen 530, for example, provides one or more digital overlays. The one or more digital overlays provide, for example, features including at least one of an exposure setting, a histogram, a live preview of a captured image, combinations of the same, or the like. The dual-mode viewfinder assembly integrates digital advantages of a DVF.

In some embodiments, at least one of the transparent display 510, the one-directional pass-through coating 520, the matte focusing screen 530, the transparent imaging sensor 540, combinations of the same, or the like are provided along a common axis 550. For example, the common axis 550 passes through a center point of each of the transparent display 510, the one-directional pass-through coating 520, the matte focusing screen 530, and the transparent imaging sensor 540. Also, for example, the transparent display 510 faces an operator of the digital camera. For example, the one-directional pass-through coating 520 is provided between the transparent display 510 and the matte focusing screen 530. The matte focusing screen 530 is provided between the one-directional pass-through coating 520 and the transparent imaging sensor 540, for example. The transparent imaging sensor 540 is provided between the matte focusing screen 530 and a lens (not shown), for example.

In some embodiments, a first side 513 of the transparent display 510 is oriented in a direction that faces an operator of the digital camera. For example, a first side 523 of the one-directional pass-through coating 520 faces a second side 516 of the transparent display 510. For example, a first side 533 of the matte focusing screen 530 faces a second side 526 of the one-directional pass-through coating 520. For example, a first side 543 of the transparent imaging sensor 540 faces a second side 536 of the matte focusing screen 530. For example, a first side of a lens (not shown, e.g., in a body of the digital camera 500) faces a second side 546 of the transparent imaging sensor 540. For example, the transparent display 510 is in direct contact with the one-directional pass-through coating 520. For example, the one-directional pass-through coating 520 is in direct contact with the matte focusing screen 530. For example, the matte focusing screen 530 is in direct contact with the transparent imaging sensor 540.

In some embodiments, the transparent display 510 displays at least one of a camera setting, a digital overlay (e.g., a histogram), a preview of a final image, combinations of the same, or the like. For example, the transparent display 510 displays the camera setting, the digital overlay (including the histogram), and the preview of the final image in real time including real-time adjustments.

In some embodiments, the one-directional pass-through coating 520 is provided on a back side of the transparent display 510. For example, the one-directional pass-through coating 520 blocks light (e.g., from the transparent display 510 from entering the transparent imaging sensor 540 while allowing light to pass from a front side of the digital camera 500 (e.g., the side having the lens) to a back side of the digital camera 500 (e.g., the side having transparent display 510).

In some embodiments, the matte focusing screen 530 provides an OVF experience. For example, the matte focusing screen 530 provides the OVF experience with real-time viewing, which is unaffected by electronic delays.

In some embodiments, the transparent imaging sensor 540 utilizes graphene-based technology. For example, the transparent imaging sensor 540 with graphene provides high electron mobility and broadband absorption. For example, the transparent imaging sensor 540 is transparent and provides effective light-to-electrical signal conversion.

In some embodiments, the lens (not shown) directs light towards the transparent imaging sensor 540. For example, the lens allows real-time optical viewing through the matte focusing screen 530. For example, the lens (not shown) is part of a lens assembly having a plurality of lenses.

Figure 3A:
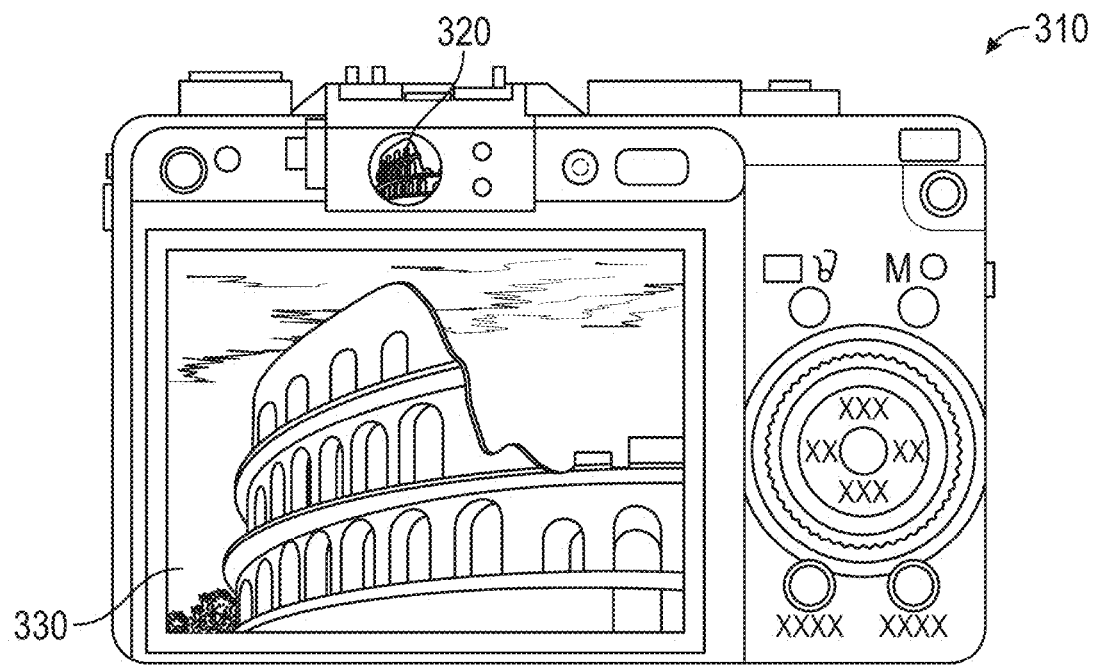
FIG. 3A depicts a back side of a digital camera including an OVF and a separate electronic viewfinder, in accordance with one approach.
Figure 3B:
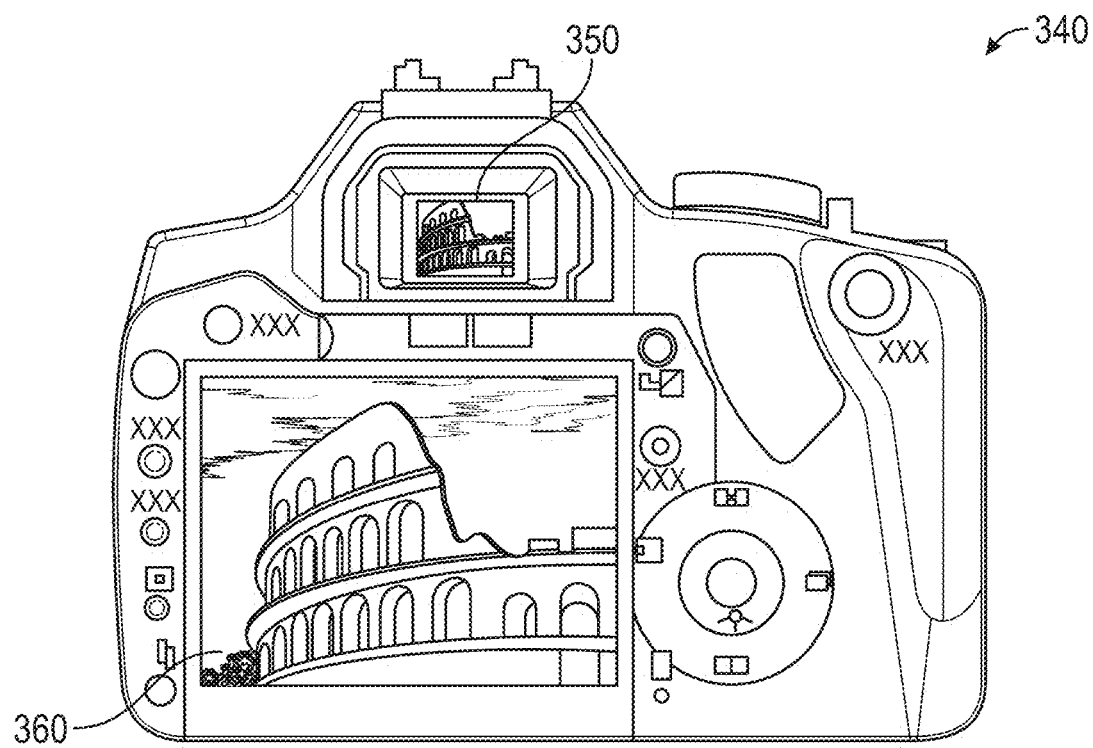
FIG. 3B depicts a back side of a DSLR including an OVF and a separate electronic viewfinder, in accordance with another approach.
Figure 3C:
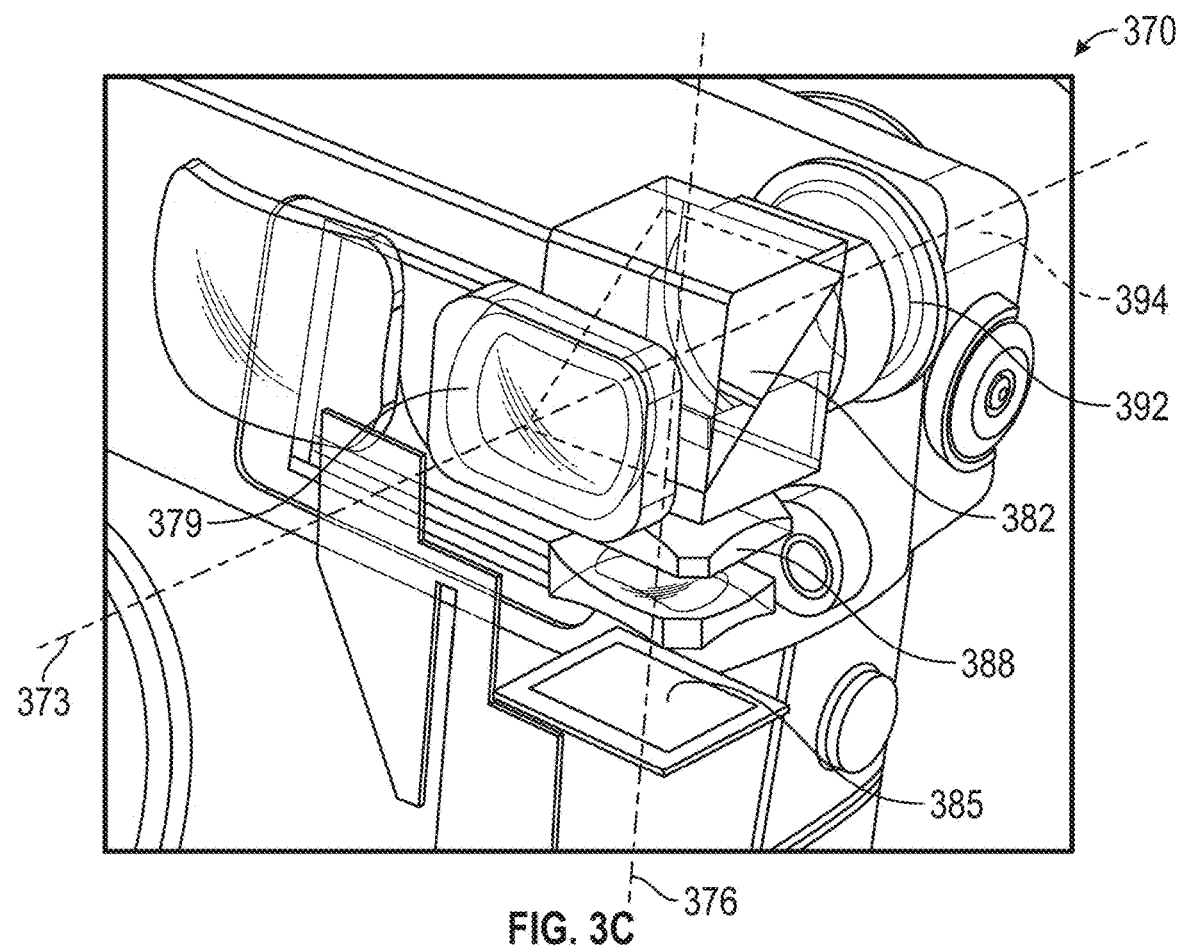
FIG. 3C depicts a perspective view of a corner of a digital camera including details of a hybrid multi viewfinder, in accordance with still another approach.
Figure 3D:
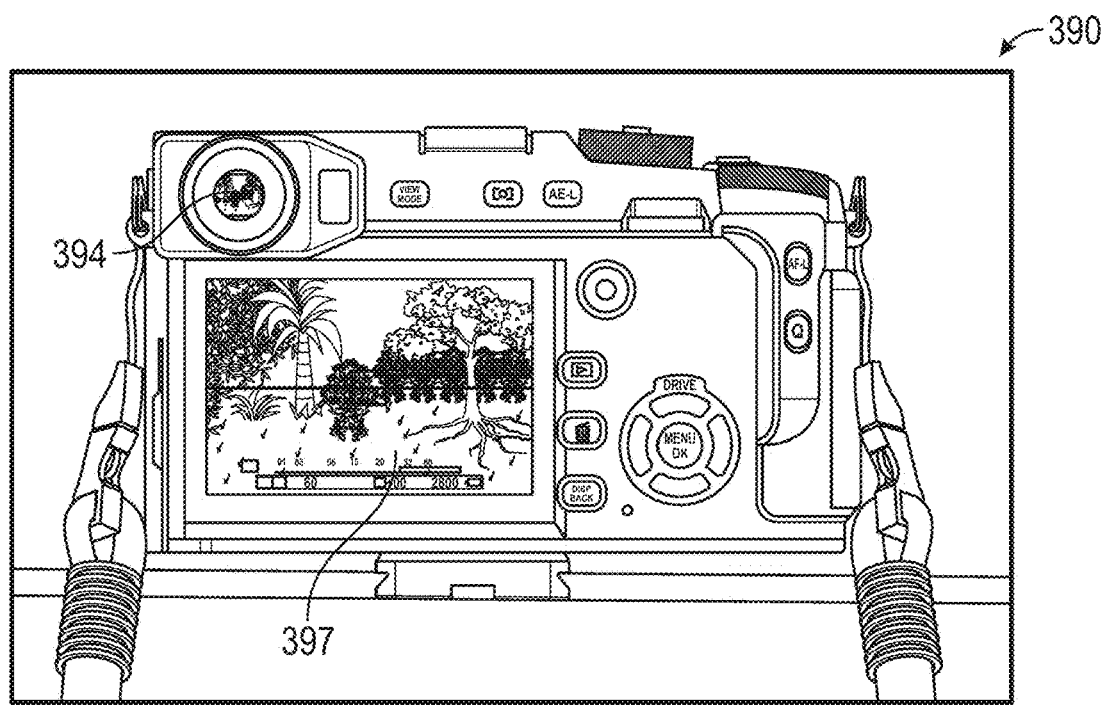
FIG. 3D depicts a back side of the digital camera of FIG. 3C including an OVF and a separate electronic viewfinder.

A hybrid system, such as that shown, for example, in FIGS. 4 and 5, provides numerous benefits. For example, the hybrid system provides for real-time optical viewing with zero lag. For example, the hybrid system provides capture of fast-moving subjects. For example, the hybrid system provides a digital overlay of camera settings and image previews. For example, the hybrid system provides features of both an OVF and a DVF without requiring a switch of modes and/or viewfinders. For example, the use of a transparent imaging sensor (e.g., 430 or 540) provides a digital camera (e.g., 500) with a compact overall design and with less bulk than a DSLR camera (e.g., FIG. 3B).

Figure 6:
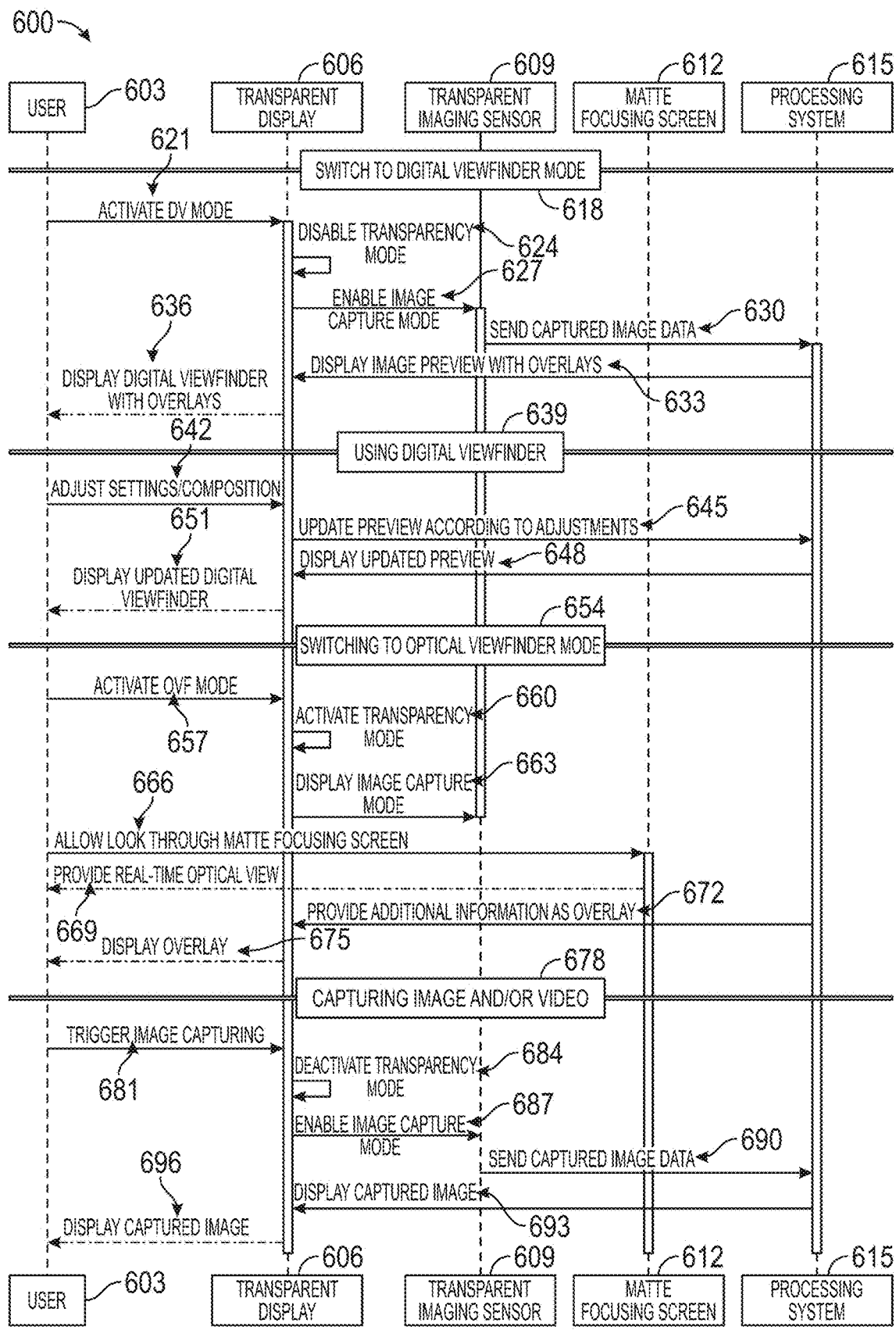
FIG. 6 depicts a sequence diagram of a process including interactions within a digital camera including a dual-mode viewfinder, in accordance with some embodiments of the disclosure.

FIG. 6 depicts a sequence diagram of a process 600 comprising interactions within a digital camera system including a dual-mode viewfinder, in accordance with some embodiments of the disclosure. In some embodiments, the process 600 includes interactions with and/or between a user 603 and a digital camera, where the digital camera includes at least one of a transparent display 606, a transparent imaging sensor 609, a matte focusing screen 612, a processing system 615, combinations of the same, or the like. For example, the process 600 includes at least one of switching 618 to a DVF mode, using 639 a DVF, switching 654 to an OVF, capturing 678 an image and/or a video, combinations of the same, or the like.

In some embodiments, the switching 618 to the DVF mode includes the user 603 activating 621 the DVF mode. For example, the switching 618 to the DVF mode includes, based at least in part on the activating 621, disabling 624 a transparency mode of the transparent display 606. That is, for example, the transparent display 606 exits the transparency mode to become opaque and/or display-ready, ensuring that digital content can be shown. For example, the switching 618 to the DVF mode includes enabling 627 an image capture mode at the transparent imaging sensor 609. That is, for example, the transparent imaging sensor 609 is enabled for image capture mode, allowing the transparent imaging sensor 609 to capture images and send 630 corresponding data to the processing system 615. For example, the switching 618 to the DVF mode includes capturing (not shown) an image at the transparent imaging sensor 609. For example, the switching 618 to the DVF mode includes sending 630 captured image data from the transparent imaging sensor 609 to the processing system 615. For example, the switching 618 to the DVF mode includes generating (not shown), at the processing system 615, the captured image data into an image preview. The image preview may include one or more overlays. For example, the switching 618 to the DVF mode includes displaying 633 the image preview (e.g., generated at the processing system 615) with the one or more overlays at the transparent display 606. That is, for example, the processing system 615 sends the image preview, along with any digital overlays (e.g., settings, histograms, or the like), to the transparent display 606 for the user 603 to view. For example, the switching 618 to the DVF mode includes displaying 636 the DVF with the one or more overlays to the user 603 via the transparent display 606.

In some embodiments, the using 639 the DVF includes the user 603 adjusting 642 settings and/or composition of the image and/or video directly through an interface of the DVF. For example, the using 639 the DVF includes, based at least in part on the adjusting 642, adjusting the transparent display 606. For example, the using 639 the DVF includes, based at least in part on the adjusting 642, updating 645 an image preview according to the adjustments at the processing system 615. For example, the adjustments may be shown in real time. For example, the using 639 the DVF includes displaying 648 the updated preview at the transparent display 606. For example, the using 639 the DVF includes displaying 651 an updated DVF to the user 603 via the transparent display 606.

In some embodiments, the switching 654 to the OVF mode includes the user 603 activating 657 the OVF mode. For example, the switching 654 to the OVF mode includes, based at least in part on the activating 657 the OVF mode, activating 660 a transparency mode of the transparent display 606. For example, the switching 654 to the OVF mode includes disabling 663 the image capture mode at the transparent imaging sensor 609. That is, for example, disabling 663 of the transparent imaging sensor 609 for image capture permits provision 669 of an unobstructed path for optical viewing between the user 606 and, for example, an image created by light through a lens of the digital camera. For example, the switching 654 to the OVF mode includes allowing 666 the user 606 to look through the matte focusing screen 612. For example, the switching 654 to the OVF mode includes providing 672 (e.g., from the processing system 615) additional information (e.g., exposure settings, focus points, or the like), as an overlay on the transparent display 606. That is, for example, the overlay enhances the optical view with useful digital information without disrupting the direct optical path. For example, the switching 654 to the OVF mode includes displaying 675 the overlay (e.g., with the additional information) to the user 603 via the transparent display 606.

In some embodiments, the capturing 678 of the image and/or the video includes the user 603 triggering 681 image capturing. That is, for example, upon deciding to capture an image, the user 603 triggers the image capturing process by pressing a button on the digital camera (or any other suitable trigger, whether automated, programmed or manual). For example, the capturing 678 of the image and/or the video includes, based at least in part on the triggering 681, deactivating 684 the transparency mode at the transparent display 606. That is, for example, the transparent display 606 deactivates 684 its transparency mode to prepare for showing the captured image. For example, the capturing 678 of the image and/or the video includes enabling 687 (or re-enabling) the image capture mode of the transparent imaging sensor 609. For example, the capturing 678 of the image and/or the video includes sending 690 captured image data to the processing system 615, where the data is processed into an image for display. For example, the capturing 678 of the image and/or the video includes sending 693 the captured image to and displaying 696 the captured image at the transparent display 606. For example, the capturing 678 of the image and/or the video includes displaying 696 the captured image to the user 603 via the transparent display 606. That is, for example, once the image is captured, the processing system 615 sends the captured image data to the transparent display 606, which then shows 696 the captured image to the user 603.

Figure 7:
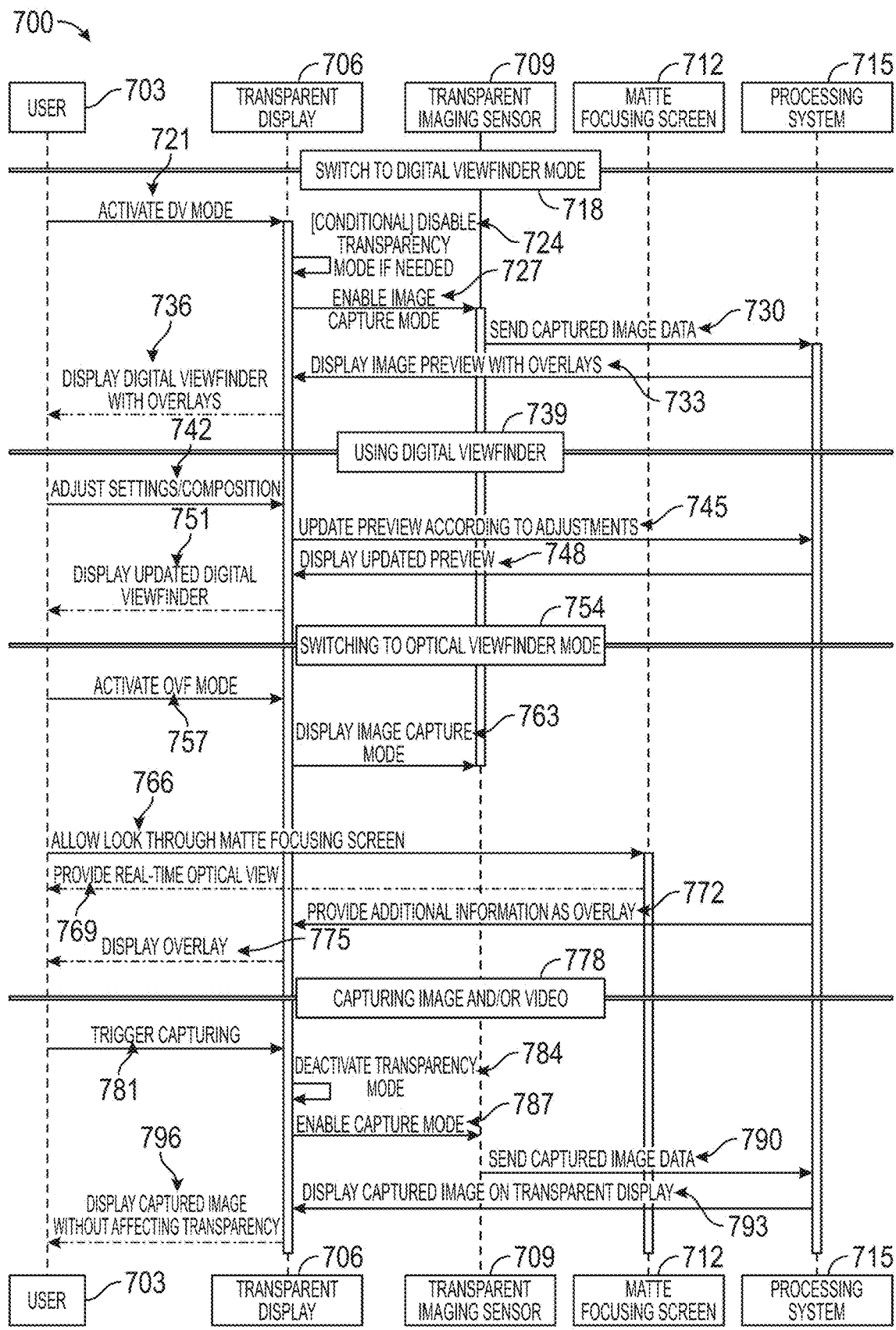
FIG. 7 depicts a sequence diagram of a process including interactions within a digital camera including a dual-mode viewfinder and a one-directional pass-through coating, in accordance with some embodiments of the disclosure.

FIG. 7 depicts a sequence diagram of a process 700 including interactions within a digital camera system that includes a dual-mode viewfinder and a one-directional pass-through coating (e.g., 520), in accordance with some embodiments of the disclosure. The process 700 includes, for example, one or more of the steps of the process 600. Reference numbers in FIG. 7 that have the same last two digits of those of FIG. 6 may designate similar or the same features. For example, the enabling 724 step may be similar or the same as the enabling 624 step described with reference to FIG. 6, except the enabling 724 step may be conditional and provided only if needed. For example, the process 700 may omit the activating 660 step, because the digital camera has the one-directional pass-through coating (e.g., 520) on a back of the transparent display. As such, for example, for the digital camera 500 having the one-directional pass-through coating 520, there is no need for the activating 660 transparency step since the one-directional pass-through coating 520 does not permit light to go to the transparent imaging sensor when capturing an image and/or a video.

In some embodiments, a transparent screen is larger than an image sensor. For example, two different coatings are applied to a back of the transparent display. For example, a first area of the back of the transparent display corresponding to the image sensor includes a one-directional pass-through coating, and a second area of the back of the transparent display around the image sensor includes a black coating that blocks light from either direction. For example, for a DSLR, the one-directional pass-through coating is provided, for example. Again, for example, for the DSLR, a mirror is flipped up to block light from the OVF to a sensor when an aperture is open, and the one-directional pass-through coating blocks the light.

Figure 8:
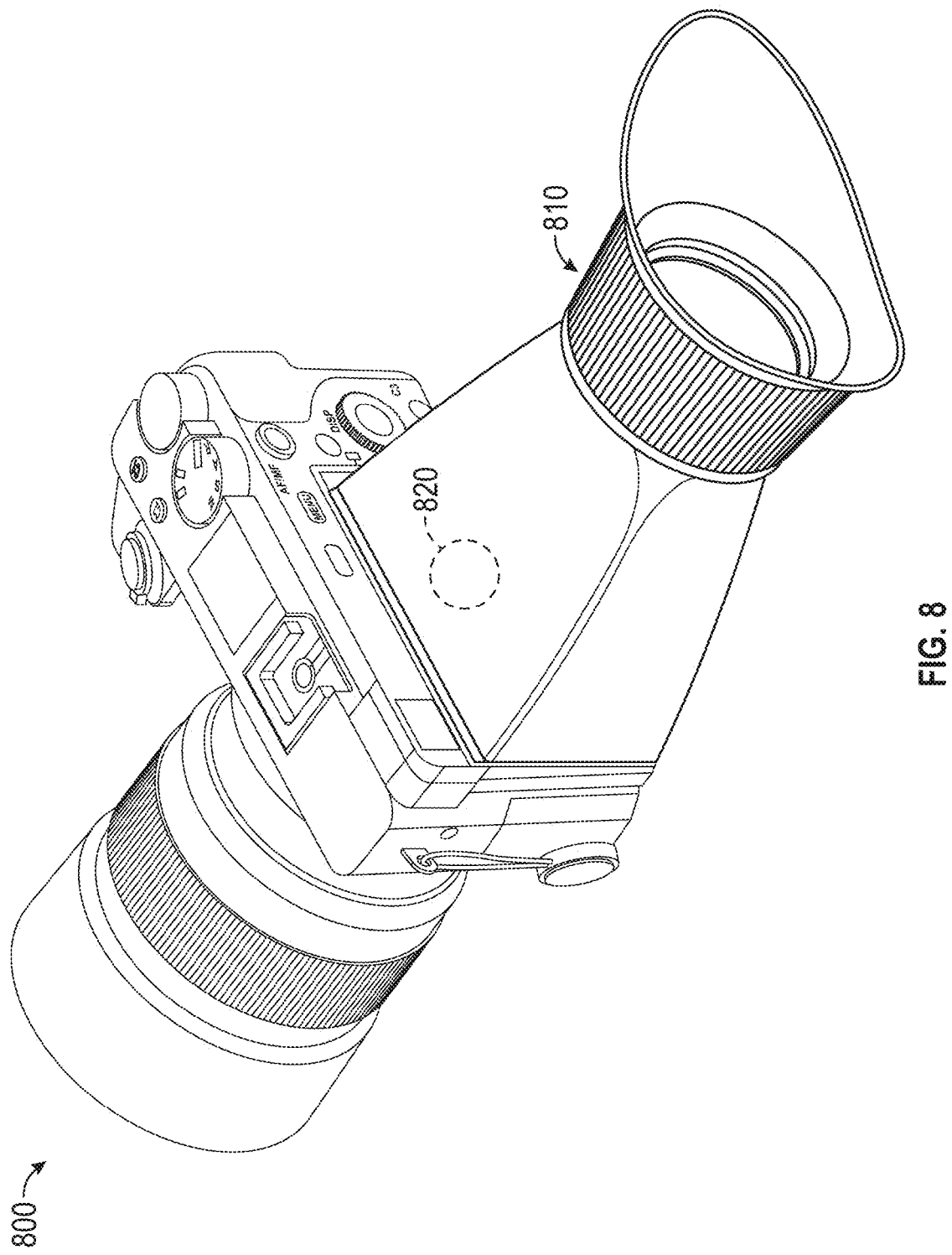
FIG. 8 depicts a perspective view of a digital camera with a dual-mode viewfinder including an automatic switch for switching between modes, in accordance with some embodiments of the disclosure.

FIG. 8 depicts a perspective view of a digital camera with a dual-mode viewfinder including an automatic switch for switching between modes, in accordance with some embodiments of the disclosure. In some embodiments, an eyepiece 810 is added to a back of a digital camera 800. For example, the eyepiece 810 helps to reduce ambient light and provides a clearer OVF.

In some embodiments, an automatic switch between the OVF mode and the DVF mode is provided. For example, the digital camera 800 includes a proximity sensor 820. For example, the proximity sensor 820 detects whether the user is relatively close to the view finder. In response to the sensor 820 detecting that an eye or eyes of the user are within a predetermined threshold distance, the digital camera 800 automatically switches to the OVF mode. In response to the sensor 820 detecting that the eye or the eyes of the user are beyond the predetermined threshold distance, the digital camera 800 automatically switches to DVF mode. In some embodiments, the digital camera 800 is provided with the sensor 820 and without the eyepiece 810. In some embodiments, the digital camera 800 is provided with the eyepiece 810 and without the sensor 820.

In some embodiments, an optical setting (e.g., a magnifying lens; not shown) is provided to enlarge an image on the OVF.

Throughout the specification, where an "image" is discussed, it is understood the feature also applies to video.

In some embodiments, the OVF mode includes provision of a transparent display as a near-eye display, e.g., a high pixels per inch or pixel density transparent display. For example, overlay rendering is different from what is displayed during a DVF mode. For example, the DVF mode includes provision of a display for viewing from a relatively larger distance compared to that of the OVF mode. For example, a compensation is processed in the OVF mode and/or in the DVF mode to change perceived and/or actual pixelation.

In some embodiments, the OVF mode is provided to save battery life. For example, displaying and/or reviewing captured content is provided as a choice for the user after capture. That is, for example, selection of the display and/or review of the captured content triggers a transparency change, if needed.

In some embodiments, transparency is region-based or pixel-based. For example, a portion of the display that corresponds with an optical view does not include an overlay.

Each of FIGS. 9-15 depicts a diagram of components of various embodiments of a viewfinder from a perspective above a camera. Components are depicted with spaces between them. In some embodiments, two or more of the components are in direct contact with each other (such as shown in FIG. 5). Additional components may be provided in addition to those depicted. In some embodiments, as shown in FIGS. 9-15, the components are aligned about a common axis. For example, the common axis passes through a center point of each of the depicted components. Also, a center of a beam or field of the "visible light" passing through the illustrated components shown in FIGS. 9-15 occurs at or near a center point of the respective structures, for example, at or near a point where the common axis 450 or the common axis 550 shown in FIGS. 4 and 5, respectively, intersects with the illustrated components.

Figure 9:
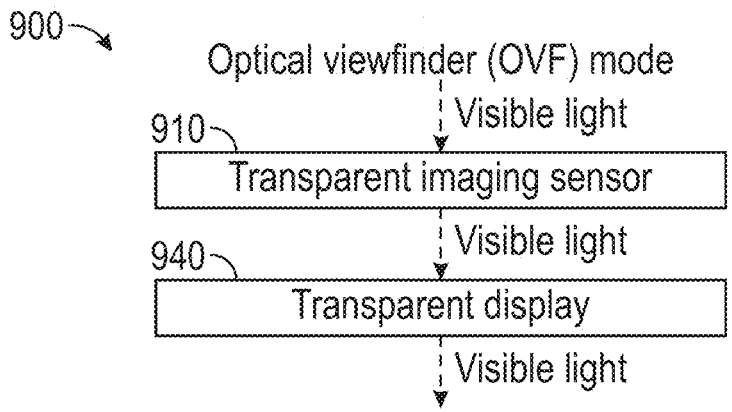
FIG. 9 depicts a diagram of a viewfinder of a camera in an OVF mode including transmission of visible light through a transparent imaging sensor and a transparent display of the camera, in accordance with some embodiments of the disclosure.

FIG. 9 depicts a diagram of a viewfinder 900 of a camera in an OVF mode including transmission of visible light through a transparent imaging sensor 910 and a transparent display 940 of the camera, in accordance with some embodiments of the disclosure.

Figure 10:
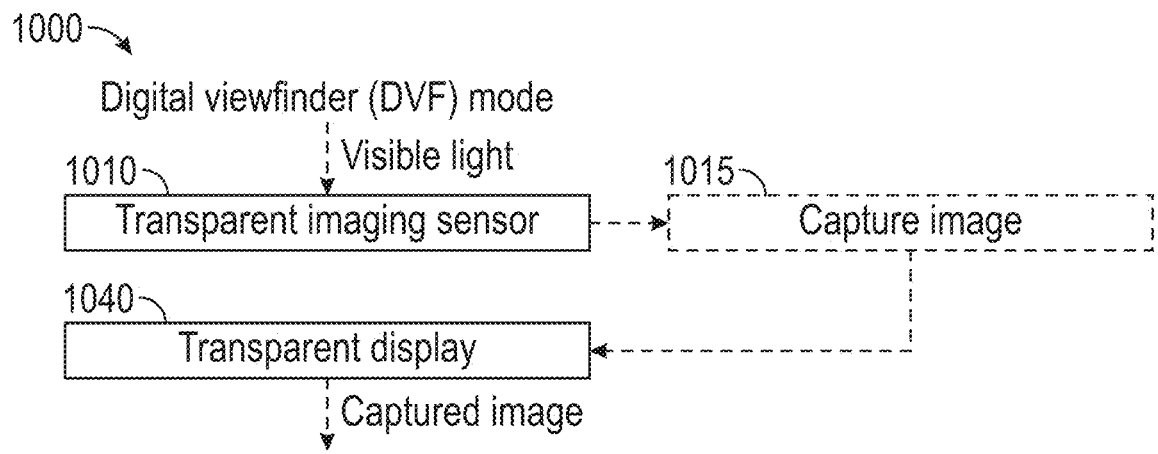
FIG. 10 depicts a diagram of a viewfinder of a camera in a DVF mode including transmission of visible light to a transparent imaging sensor, image capture, and display of a captured image at a transparent display, in accordance with some embodiments of the disclosure.

FIG. 10 depicts a diagram of a viewfinder 1000 of a camera in a DVF mode including transmission of visible light to a transparent imaging sensor 1010, image capture 1015, and display of a captured image at a transparent display 1040, in accordance with some embodiments of the disclosure.

Figure 11:
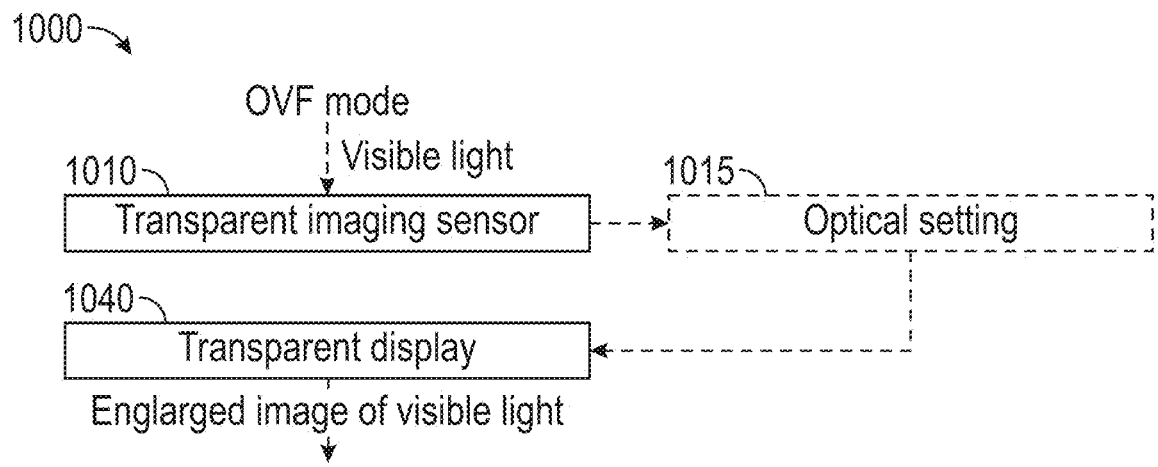
FIG. 11 depicts a diagram of a viewfinder of a camera in an OVF mode including transmission of visible light to a transparent imaging sensor, modification of the visible light according to an optical setting, and display of an enlarged image of the visible light at a transparent display, in accordance with some embodiments of the disclosure.

FIG. 11 depicts a diagram of a viewfinder 1100 of a camera in an OVF mode including transmission of visible light to a transparent imaging sensor 1110, modification of the visible light according to an optical setting 1115, and display of an enlarged image of the visible light at a transparent display 1140, in accordance with some embodiments of the disclosure.

FIG. 12 depicts a diagram of a viewfinder 1200 of a camera including transmission of visible light through a transparent imaging sensor 1210, a one-directional pass-through coating 1230, and a transparent display 1240 of the camera, in accordance with some embodiments of the disclosure. For example, the one-directional pass-through coating 1230 blocks light from the transparent display 1240 from passing through to the transparent imaging sensor 1210. For example, the one-directional pass-through coating 1230 allows light from outside the viewfinder 1200 through to the transparent display 1240 and to an operator of the camera (not shown).

FIG. 13 depicts a diagram of a viewfinder 1300 of a camera including transmission of visible light through a transparent imaging sensor 1310, a matte focusing screen 1320, and a transparent display 1340 of the camera, in accordance with some embodiments of the disclosure. In some embodiments, for example, in a camera without a light blocking coating for the transparent display 1340, the transparent display 1340 operates in a transparent mode associated with an OVF mode, and the transparent display operates in an opaque mode (e.g., transparency disabled) associated with a DVF mode. In the opaque mode, light from the transparent display 1340 does not propagate back to the transparent imaging sensor 1310.

FIG. 14 depicts a diagram of a viewfinder 1400 of a camera including transmission of visible light through a transparent imaging sensor 1410, a matte focusing screen 1420, a one-directional pass-through coating 1430, and a transparent display 1440 of the camera, in accordance with some embodiments of the disclosure. The one-directional pass-through coating 1430 blocks light from the transparent display 1440 from passing through to the matte focusing screen 1420 or the transparent imaging sensor 1410. For example, the one-directional pass-through coating 1430 allows light from outside the viewfinder 1400 through to the transparent display 1440 and to an operator of the camera (not shown).

FIG. 15 depicts a diagram of a viewfinder 1500 of a camera in an OVF mode including transmission of visible light through a transparent imaging sensor 1510 and a transparent display 1540 of the camera, the transparent display 1540 including a peripheral region 1545 for display of an overlay (such as that shown in FIG. 1), in accordance with some embodiments of the disclosure. That is, for example, a central region of the transparent display 1540 allows light to pass through the transparent display 1540, and the peripheral region 1545 of the transparent display 1540 displays the overlay. Similar to FIG. 13 herein, in some embodiments, for a camera without a light blocking coating for the transparent display 1540, the transparent display 1540 operates in a transparent mode associated with an OVF mode, and the transparent display 1540 operates in an opaque mode (e.g., transparency disabled) associated with a DVF mode.

FIG. 16 depicts a process 1600 for a camera including a dual-mode viewfinder operating in an OVF mode, in accordance with some embodiments of the disclosure. For example, the process 1600 includes switching 1610 a camera to an OVF mode, the camera including a transparent imaging sensor and a transparent display. For example, the process 1600 includes one or more functions performed while the camera is in the OVF mode. For example, the process 1600 includes receiving 1620 (e.g., first) light at the transparent imaging sensor. For example, the process 1600 includes allowing 1630 the (e.g., first) light to pass through the transparent imaging sensor. For example, the process 1600 includes receiving 1640 the (e.g., first) light at the transparent display. For example, the process 1600 includes allowing 1650 the (e.g., first) light to pass through the transparent display such that the (e.g., first) light is visible at a viewfinder of the camera.

FIG. 17 depicts a process 1700 for a camera including a dual-mode viewfinder operating in a DVF mode, in accordance with some embodiments of the disclosure. For example, the process 1700 includes switching 1710 a camera to a DVF mode, the camera including a transparent imaging sensor and a transparent display. For example, the process 1700 includes one or more functions performed while the camera is in the digital viewfinder mode. For example, the process 1700 includes receiving 1720 (e.g., second) light at the transparent imaging sensor. For example, the process 1700 includes capturing 1730, using the transparent imaging sensor, an image corresponding to the received (e.g., second) light. For example, the process 1700 includes generating 1740 for display, at the transparent display of the camera, the captured image.

In some embodiments, the process 1600 and the process 1700 are performed consecutively by a same camera.

FIG. 18 depicts a process 1800 for a digital camera including a viewfinder operating in an OVF mode, in accordance with some embodiments of the disclosure. For example, the digital camera includes a transparent imaging sensor and a transparent display. For example, the process 1800 includes operating 1810 the digital camera in the OVF mode. For example, the process 1800 includes capturing 1820 an image with the digital camera in the OVF mode.

FIG. 19 depicts a process 1900 for a camera including a viewfinder operating in an OVF mode, the process including image capture and processing, in accordance with some embodiments of the disclosure. For example, the process 1900 includes receiving 1910 an image capture signal. For example, the process 1900 includes deactivating 1920 a transparency mode at a transparent display. For example, the process 1900 includes enabling 1930 an image capture mode. For example, the process 1900 includes sending 1940 the captured image from a transparent imaging sensor to a processing system. For example, the process 1900 includes processing 1950 the captured image at the processing system. For example, the process 1900 includes providing 1960 for display the captured image based at least in part on the processed captured image data from the processing system.

In some embodiments, the process 1800 and the process 1900 are performed consecutively by a same camera.

FIG. 20 depicts a process 2000 for a camera including a viewfinder operating in an OVF mode, the process including first and second light through components of the camera, in accordance with some embodiments of the disclosure. For example, the process 2000 includes operating 2010 a camera in an OVF mode. For example, the camera includes a transparent imaging sensor and a transparent display. For example, the process 2000 includes, while the camera is in the OVF mode, receiving 2020 first light at the transparent imaging sensor. For example, the process 2000 includes allowing 2030 the first light to pass through the transparent imaging sensor. For example, the process 2000 includes receiving 2040 the first light at the transparent display. For example, the process 2000 includes allowing 2050 the first light to pass through the transparent display such that the first light is visible at a viewfinder of the camera. For example, the process 2000 includes receiving 2060 second light at the transparent imaging sensor. For example, the process 2000 includes capturing 2070, using the transparent imaging sensor, an image corresponding to the received second light. For example, the process 2000 includes generating 2080 for display, at the transparent display of the camera, the captured image.

Communication System

A communication system is provided including a computing device, a server, and a communication network. Both the server and the communication network can exist in multiple forms and can connect directly or indirectly. The computing device includes control circuitry, a display, and I/O circuitry. The control circuitry can execute systems, methods, processes, and outputs. Both the computing device and server include control circuitry and storage, which can store content, metadata, data, user profiles, messages, and commands for an application. The computing device communicates with an I/O device and can receive and process user inputs locally or transmit them to the remote server for processing. Both the server and the computing device can transmit and receive content via the communication network or directly, and the processing circuitry receives the user input and converts it to digital signals.

In some embodiments, the system is a distributed network architecture with an edge device (a type of computing device 2102), a cloud server (a type of server 2104), and an internet of things (IoT) network (a type of communication network 2106). Both the edge device and server have microservices and data lakes. The edge device includes a user interface and I/O ports. User interactions can be processed at the edge or in the cloud. The system can transmit and receive digital assets via the IoT network. The edge device communicates with an IoT device and can be various types of smart devices capable of displaying and interacting with digital content. The communication paths in the system can be optimized for latency and bandwidth efficiency.

FIG. 21 depicts a block diagram of system 2100, in accordance with some embodiments. The system is shown to include computing device 2102, server 2104, and a communication network 2106. It is understood that while a single instance of a component may be shown and described relative to FIG. 21, additional embodiments of the component may be employed. For example, server 2104 may include, or may be incorporated in, more than one server. Similarly, communication network 2106 may include, or may be incorporated in, more than one communication network. Server 2104 is shown communicatively coupled to computing device 2102 through communication network 2106. While not shown in FIG. 21, server 2104 may be directly communicatively coupled to computing device 2102, for example, in a system absent or bypassing communication network 2106.

Communication network 2106 may include one or more network systems, such as, without limitation, the Internet, LAN, Wi-Fi, wireless, or other network systems suitable for audio processing applications. The system 2100 of FIG. 21 excludes server 2104, and functionality that would otherwise be implemented by server 2104 is instead implemented by other components of the system depicted by FIG. 21, such as one or more components of communication network 2106. In still other embodiments, server 2104 works in conjunction with one or more components of communication network 2106 to implement certain functionality described herein in a distributed or cooperative manner. Similarly, the system depicted by FIG. 21 excludes computing device 2102, and functionality that would otherwise be implemented by computing device 2102 is instead implemented by other components of the system depicted by FIG. 21, such as one or more components of communication network 2106 or server 2104 or a combination of the same. In other embodiments, computing device 2102 works in conjunction with one or more components of communication network 2106 or server 2104 to implement certain functionality described herein in a distributed or cooperative manner.

Computing device 2102 includes control circuitry 2108, display 2110 and input/output (I/O) circuitry 2112. Control circuitry 2108 may be based on any suitable processing circuitry and includes control circuits and memory circuits, which may be disposed on a single integrated circuit or may be discrete components. As referred to herein, processing circuitry should be understood to mean circuitry based on at least one microprocessors, microcontrollers, digital signal processors, programmable logic devices, field-programmable gate arrays (FPGAs), application-specific integrated circuits (ASICs), system-on-chip (SoC), application-specific standard parts (ASSPs), indium phosphide (InP)-based monolithic integration and silicon photonics, non-classical devices, organic semiconductors, compound semiconductors, "More Moore" devices, "More than Moore" devices, cloud-computing devices, combinations of the same, or the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). Some control circuits may be implemented in hardware, firmware, or software. Control circuitry 2108 in turn includes communication circuitry 2126, storage 2121 and processing circuitry 2118. Either of control circuitry 2108 and 2134 may be utilized to execute or perform any or all the systems, methods, processes, and outputs of one or more of FIGS. 1, 2, and 4-20, or any combination of steps thereof (e.g., as enabled by processing circuitries 2118 and 2136, respectively).

In addition to control circuitry 2108 and 2134, computing device 2102 and server 2104 may each include storage (storage 2121, and storage 2138, respectively). Each of storages 2121 and 2138 may be an electronic storage device. As referred to herein, the phrase "electronic storage device" or "storage device" should be understood to mean any device for storing electronic data, computer software, or firmware, such as random-access memory, read-only memory, cloud-based storage, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 2121 and 2138 may be used to store several types of content, metadata, and/or other types of data. Non-volatile memory may also be used (e.g., to launch a boot-up routine and other instructions). Cloud-based storage may be used to supplement storages 2121 and 2138 or instead of storages 2121 and 2138. In some embodiments, a user profile and messages corresponding to a chain of communication may be stored in one or more of storages 2121 and 2138. Each of storages 2121 and 2138 may be utilized to store commands, for example, such that when each of processing circuitries 2118 and 2136, respectively, are prompted through control circuitries 2108 and 2134, respectively. Either of processing circuitries 2118 or 2136 may execute any of the systems, methods, processes, and outputs of one or more of FIGS. 1, 2, and 4-20, or any combination of steps thereof.

In some embodiments, control circuitry 2108 and/or 2134 executes instructions for an application stored in memory (e.g., storage 2121 and/or storage 2138). Specifically, control circuitry 2108 and/or 2134 may be instructed by the application to perform the functions discussed herein. In some embodiments, any action performed by control circuitry 2108 and/or 2134 may be based on instructions received from the application. For example, the application may be implemented as software or a set of and/or one or more executable instructions that may be stored in storage 2121 and/or 2138 and executed by control circuitry 2108 and/or 2134. The application may be a client/server application where only a client application resides on computing device 2102, and a server application resides on server 2104.

The application may be implemented using any suitable architecture. For example, it may be a stand-alone application wholly implemented on computing device 2102. In such an approach, instructions for the application are stored locally (e.g., in storage 2121), and data for use by the application is downloaded on a periodic basis (e.g., from an out-of-band feed, from an Internet resource, or using another suitable approach). Control circuitry 2108 may retrieve instructions for the application from storage 2121 and process the instructions to perform the functionality described herein. Based on the processed instructions, control circuitry 2108 may determine a type of action to perform based at least in part on input received from I/O circuitry 2112 or from communication network 2106.

The computing device 2102 is configured to communicate with an I/O device (not shown) via the I/O circuitry 2112. In some embodiments, the user input 2114 is received from the I/O device. A wired and/or wireless connection between the I/O circuitry 2112 and the I/O device is provided in some embodiments. The I/O device may be, for example, at least one of a keyboard, a mouse, a touchscreen, a microphone, a scanner, a joystick, a graphics tablet, a monitor, a printer, speakers, headphones, a projector, a headset, a wearable device, a gaming controller, an external hard drive, a USB hard drive, an SD card, a network interface card (NIC), combinations of the same, or the like.

In client/server-based embodiments, control circuitry 2108 may include communication circuitry suitable for communicating with an application server (e.g., server 2104) or other networks or servers. The instructions for conducting the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 2106). In another example of a client/server-based application, control circuitry 2108 runs a web browser that interprets web pages provided by a remote server (e.g., server 2104). For example, the remote server may store the instructions for the application in a storage device.

The remote server may process the stored instructions using circuitry (e.g., control circuitry 2134) and/or generate displays. Computing device 2102 may receive the displays generated by the remote server and may display the content of the displays locally via display 2110. For example, display 2110 may be utilized to present a string of characters. This way, the processing of the instructions is performed remotely (e.g., by server 2104) while the resulting displays, such as the display windows described elsewhere herein, are provided locally on computing device 2104. Computing device 2102 may receive inputs from the user via input/output circuitry 2112 and transmit those inputs to the remote server for processing and generating the corresponding displays.

Alternatively, computing device 2102 may receive inputs from the user via input/output circuitry 2112 and process and display the received inputs locally, by control circuitry 2108 and display 2110, respectively. For example, input/output circuitry 2112 may correspond to a keyboard and/or a set of and/or one or more speakers/microphones which are used to receive user inputs (e.g., input as displayed in a search bar or a display of FIG. 21 on a computing device). Input/output circuitry 2112 may also correspond to a communication link between display 2110 and control circuitry 2108 such that display 2110 updates based at least in part on inputs received via input/output circuitry 2112 (e.g., simultaneously update what is shown in display 2110 based on inputs received by generating corresponding outputs based on instructions stored in memory via a non-transitory, computer-readable medium).

Server 2104 and computing device 2102 may transmit and receive content and data such as media content via communication network 2106. For example, server 2104 may be a media content provider, and computing device 2102 may be a smart television configured to download or stream media content, such as a live news broadcast, from server 2104. Control circuitry 2134, 2108 may send and receive commands, requests, and other suitable data through communication network 2106 using communication circuitry 2132, 2126, respectively. Alternatively, control circuitry 2134, 2108 may communicate directly with each other using communication circuitry 2132, 2126, respectively, avoiding communication network 2106. It is understood that computing device 2102 is not limited to the embodiments and methods shown and described herein. In nonlimiting examples, computing device 2102 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 2102 receives user input 2114 at input/output circuitry 2112. For example, computing device 2102 may receive a user input such as a user swipe or user touch. It is understood that computing device 2102 is not limited to the embodiments and methods shown and described herein.

User input 2114 may be received from a user selection-capturing interface that is separate from device 2102, such as a remote-control device, trackpad, or any other suitable user movement-sensitive, audio-sensitive or capture devices, or as part of device 2102, such as a touchscreen of display 2110. Transmission of user input 2114 to computing device 2102 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, NearLink, ultra-wideband technology, or any other suitable wireless transmission protocol. Input/output circuitry 2112 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, NearLink, ultra-wideband technology, or other wireless transmission protocols.

Processing circuitry 2118 may receive user input 2114 from input/output circuitry 2112 using communication path 2116. Processing circuitry 2118 may convert or translate the received user input 2114 that may be in the form of audio data, visual data, gestures, or movement to digital signals. In some embodiments, input/output circuitry 2112 performs the translation to digital signals. In some embodiments, processing circuitry 2118 (or processing circuitry 2136, as the case may be) conducts disclosed processes and methods.

Processing circuitry 2118 may provide requests to storage 2121 by communication path 2120. Storage 2121 may provide requested information to processing circuitry 2118 by communication path 2146. Storage 2121 may transfer a request for information to communication circuitry 2126 which may translate or encode the request for information to a format receivable by communication network 2106 before transferring the request for information by communication path 2128. Communication network 2106 may forward the translated or encoded request for information to communication circuitry 2132, by communication path 2130.

At communication circuitry 2132, the translated or encoded request for information, received through communication path 2130, is translated or decoded for processing circuitry 2136, which will provide a response to the request for information based on information available through control circuitry 2134 or storage 2138, or a combination thereof. The response to the request for information is then provided back to communication network 2106 by communication path 2140 in an encoded or translated format such that communication network 2106 forwards the encoded or translated response back to communication circuitry 2126 by communication path 2142.

At communication circuitry 2126, the encoded or translated response to the request for information may be provided directly back to processing circuitry 2118 by communication path 2154 or may be provided to storage 2121 through communication path 2144, which then provides the information to processing circuitry 2118 by communication path 2146. Processing circuitry 2118 may also provide a request for information directly to communication circuitry 2126 through communication path 2152, where storage 2121 responds to an information request (provided through communication path 2120 or 2144) by communication path 2124 or 2146 that storage 2121 does not contain information pertaining to the request from processing circuitry 2118.

Processing circuitry 2118 may process the response to the request received through communication paths 2146 or 2154 and may provide instructions to display 2110 for a notification to be provided to the users through communication path 2148. Display 2110 may incorporate a timer for providing the notification or may rely on inputs through input/output circuitry 2112 from the user, which are forwarded through processing circuitry 2118 through communication path 2148, to determine how long or in what format to provide the notification. When display 2110 determines the display has been completed, a notification may be provided to processing circuitry 2118 through communication path 2150.

The communication paths provided in FIG. 21 between computing device 2102, server 2104, communication network 2106, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

Throughout the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises."

Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

As used herein, the terms "real time," "simultaneous," "substantially on-demand," and the like are understood to be nearly instantaneous but may include delay due to practical limits of the system. Such delays may be in the order of milliseconds or microseconds, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least some embodiments are described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules, and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), UltraRAM, cloud-based storage, and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

Any use of a phrase such as "in some embodiments" or the like with reference to a feature is not intended to link the feature to another feature described using the same or a similar phrase. Any and all embodiments disclosed herein are combinable or separately practiced as appropriate. Absence of the phrase "in some embodiments" does not infer that the feature is necessary. Inclusion of the phrase "in some embodiments" does not infer that the feature is not applicable to other embodiments or even all embodiments.

The systems and processes discussed herein are intended to be illustrative and not limiting. One skilled in the art would appreciate that the actions of the processes discussed herein may be omitted, modified, combined, duplicated, rearranged, and/or substituted, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any some embodiments may be applied to any other embodiment herein, and flowcharts or examples relating to some embodiments may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A dual-mode viewfinder for a digital camera, the dual-mode viewfinder comprising:
    a transparent imaging sensor that allows light to pass through the transparent imaging sensor in an optical viewfinder mode, and that captures an image in a digital viewfinder mode; and
    a transparent display that allows the light from the transparent imaging sensor to pass through the transparent display in the optical viewfinder mode, and that displays the captured image in the digital viewfinder mode.

2. The dual-mode viewfinder of claim 1, wherein the transparent display and the transparent imaging sensor are provided along a common axis.

3. The dual-mode viewfinder of claim 1, wherein the light passing through the transparent imaging sensor in the optical viewfinder mode, the light from the transparent imaging sensor passing through the transparent display in the optical viewfinder mode, and the captured image in the digital viewfinder mode are viewable from a same viewpoint.

4. The dual-mode viewfinder of claim 1, wherein the transparent display provides display of a preview of a final image with real-time adjustments.

5. The dual-mode viewfinder of claim 1, comprising a one-directional pass-through coating between the transparent imaging sensor and the transparent display.

6. The dual-mode viewfinder of claim 1, comprising a matte focusing screen between the transparent imaging sensor and the transparent display.

7. The dual-mode viewfinder of claim 6, comprising a one-directional pass-through coating between the matte focusing screen and the transparent display.

8. The dual-mode viewfinder of claim 1, wherein the transparent imaging sensor comprises a material having high electron mobility and broadband absorption.

9. The dual-mode viewfinder of claim 1, wherein the transparent imaging sensor comprises graphene.

10. The dual-mode viewfinder of claim 1, wherein all light passing from a front side of the digital camera, through at least one lens, and through the dual-mode viewfinder including the transparent imaging sensor and the transparent display is substantially oriented along on a common axis.

11. A method of operating a dual-mode viewfinder for a digital camera, the dual-mode viewfinder comprising:
    a transparent imaging sensor that allows light to pass through the transparent imaging sensor in an optical viewfinder mode, and that captures an image in a digital viewfinder mode; and a transparent display that allows the light from the transparent imaging sensor to pass through the transparent display in the optical viewfinder mode, and that displays the captured image in the digital viewfinder mode, the method comprising:

switching the digital camera to the digital viewfinder mode;

operating the digital camera in the digital viewfinder mode;

switching the digital camera to the optical viewfinder mode; and capturing the image with the digital camera.

12. The method of claim 11, wherein the transparent display and the transparent imaging sensor are provided along a common axis.

13. The method of claim 11, wherein the light passing through the transparent imaging sensor in the optical viewfinder mode, the light from the transparent imaging sensor passing through the transparent display in the optical viewfinder mode, and the captured image in the digital viewfinder mode are viewable from a same viewpoint.

14. The method of claim 11, wherein the transparent display provides display of a preview of a final image with real-time adjustments.

15. The method of claim 11, wherein the dual-mode viewfinder comprises a one-directional pass-through coating between the transparent imaging sensor and the transparent display.

16. The method of claim 11, wherein the dual-mode viewfinder comprises a matte focusing screen between the transparent imaging sensor and the transparent display.

17. The method of claim 16, wherein the dual-mode viewfinder comprises a one-directional pass-through coating between the matte focusing screen and the transparent display.

18. The method of claim 11, wherein the transparent imaging sensor comprises a material having high electron mobility and broadband absorption.

19. The method of claim 11, wherein the transparent imaging sensor comprises graphene.

20. The method of claim 11, wherein all light passing from a front of the digital camera, through a lens, and through the dual-mode viewfinder including the transparent imaging sensor and the transparent display is substantially oriented along on a common axis.

* * * * *